United States Patent
Reeves

(10) Patent No.: US 8,802,339 B2
(45) Date of Patent: Aug. 12, 2014

(54) CROSSLINKABLE URETHANE ACRYLATE CHARGE TRANSPORT MOLECULES FOR OVERCOAT

(71) Applicant: Lexmark International, Inc., Lexington, KY (US)

(72) Inventor: Scott Daniel Reeves, Louisville, CO (US)

(73) Assignee: Lexmark International, Inc., Lexington, KY (US)

( * ) Notice: Subject to any disclaimer, the term of this patent is extended or adjusted under 35 U.S.C. 154(b) by 39 days.

(21) Appl. No.: 13/731,582

(22) Filed: Dec. 31, 2012

(65) Prior Publication Data

US 2014/0186756 A1    Jul. 3, 2014

(51) Int. Cl.
*G03G 5/06* (2006.01)

(52) U.S. Cl.
USPC ......... 430/66; 430/58.7; 430/58.65; 399/159

(58) Field of Classification Search
USPC .................. 430/58.65, 66; 399/159
See application file for complete search history.

(56) References Cited

U.S. PATENT DOCUMENTS

| | | |
|---|---|---|
| 5,545,499 A | 8/1996 | Balthis |
| 5,925,486 A | 7/1999 | Levin |
| 6,001,523 A | 12/1999 | Kemmesat |
| 6,004,708 A | 12/1999 | Bellino |
| 6,033,816 A | 3/2000 | Luo |
| 6,071,660 A | 6/2000 | Black |
| 6,232,025 B1 | 5/2001 | Srinivasan |
| 6,265,124 B1 | 7/2001 | Luo |
| 6,376,143 B1 | 4/2002 | Neely |
| 7,358,017 B2 | 4/2008 | Reeves |
| 7,387,861 B2 | 6/2008 | Black |
| 7,390,602 B2 | 6/2008 | Reeves |
| 7,642,027 B2 | 1/2010 | Hartman |
| 7,955,769 B2 | 6/2011 | Black |
| 8,257,889 B2 | 9/2012 | Cote |
| 2007/0134570 A1 | 6/2007 | Hartman |

FOREIGN PATENT DOCUMENTS

JP     08-262779    * 11/1996 ............. G03G 5/147

OTHER PUBLICATIONS

Translation of abstract of JP 08-262779 published Nov. 1996.*

* cited by examiner

*Primary Examiner* — Peter Vajda

(57) ABSTRACT

An overcoat layer for an organic photoconductor drum of an electrophotographic image forming device is provided. The overcoat layer is prepared from a curable composition including a urethane methacrylate functional charge transport molecule, and a photoinitiator. The urethane acrylate functional charge transport molecule is a reaction product of hydroxyl functional charge transport molecule and a monomer having an isocyanate group and an acrylate group. This overcoat layer improves wear resistance of the organic photoconductor drum without negatively altering the electrophotographic properties, thus protecting the organic photoconductor drum from damage and extending its useful life.

11 Claims, 3 Drawing Sheets

US 8,802,339 B2

CROSSLINKABLE URETHANE ACRYLATE CHARGE TRANSPORT MOLECULES FOR OVERCOAT

CROSS REFERENCES TO RELATED APPLICATIONS

None.

BACKGROUND

1. Field of the Disclosure

The present disclosure relates generally to an electrophotographic image forming device, and more particularly to an overcoat layer for an organic photoconductor drum having excellent abrasion resistance and electrical properties.

2. Description of the Related Art

Organic photoconductor drums have generally replaced inorganic photoconductor drums in electrophotographic image forming device including copiers, facsimiles and laser printers due to their superior performance and numerous advantages compared to inorganic photoconductors. These advantages include improved optical properties such as having a wide range of light absorbing wavelengths, improved electrical properties such as having high sensitivity and stable chargeability, availability of materials, good manufacturability, low cost, and low toxicity.

While the above enumerated performance and advantages exhibited by an organic photoconductor drums are significant, inorganic photoconductor drums traditionally exhibit much higher durability—thereby resulting in a photoconductor having a desirable longer life. Inorganic photoconductor drums (e.g., amorphous silicon photoconductor drums) are ceramic-based, thus are extremely hard and abrasion resistant. Conversely, the surface of an organic photoconductor drums is typically comprised of a low molecular weight charge transport material, and an inert polymeric binder and are susceptible to scratches and abrasions. Therefore, the drawback of using organic photoconductor drums typically arises from mechanical abrasion of the surface layer of the photoconductor drum due to repeated use. Abrasion of photoconductor drum surface may arise from its interaction with print media (e.g. paper), paper dust, or other components of the electrophotographic image forming device such as the cleaner blade or charge roll. The abrasion of photoconductor drum surface degrades its electrical properties, such as sensitivity and charging properties. Electrical degradation results in poor image quality, such as lower optical density, and background fouling. When a photoconductor drum is locally abraded, images often have black toner bands due to the inability to hold charge in the thinner regions. This black banding on the print media often marks the end of the life of the photoconductor drum, thereby causing the owner of the printer with no choice but to purchase another expensive photoconductor drum. Photoconductor drum lives in the industry are extremely variable. Usually organic photoconductor drums can print between about 40,000 pages before they have to be replaced.

Increasing the life of the photoconductor drum will allow the photoconductor drum to become a permanent part of the electrophotographic image forming device. In other words, the photoconductor drum will no longer be a replaceable unit nor be viewed as a consumable item that has to be purchased multiple times by the owner of the ep printer. Photoconductor drums having an 'ultra long life' allow the printer to operate with a lower cost-per-page, more stable image quality, and less waste leading to a greater customer satisfaction with his or her printing experience. A photoconductor drum having an ultra ling life can be defined as a photoconductor drum having the ability to print at a minimum 100,000 pages before the consumer has to purchase a replacement photoconductor drum.

To achieve a long life photoconductor drum, especially with organic photoconductor drum, a protective overcoat layer may be coated onto the surface of the photoconductor drum. An overcoat layer formed from a silicon material has been known to improve life of the photoconductor drums used for color printers. However, such overcoat layer does not have the robustness for edge wear of photoconductor drums used in mono (black ink only) printers. A robust overcoat layer that improves wear resistance and extends life of photoconductor drums for both mono and color printers is desired.

Some overcoats are known to extend the life of the photoconductor drums. However one major drawback of these overcoats is that they significantly alter the electrophotographic properties of the photoconductor drum in a negative way. If the overcoat layer is too electrically insulating, the photoconductor drum will not discharge and will result in a poor latent image. On the other hand, if the overcoat layer is too electrically conducting, then the electrostatic latent image will spread resulting in a blurred image. Thus, a protective overcoat layer that extends the life of the photoconductor drum must not negatively alter the electrophotographic properties of the photoconductor drum, thereby allowing sufficient charge migration through the overcoat layer to the photoconductor surface for adequate development of the latent image with toner.

SUMMARY

The present disclosure provides an overcoat layer for an organic photoconductor drum of an electrophotographic image forming device. The overcoat layer is prepared from a UV curable composition including a urethane acrylate functional charge transport molecule, and a photoinitiator. The urethane acrylate functional charge transport molecule is a reaction product of hydroxyl functional charge transport molecule and a monomer having an isocyanate group and an acrylate group.

This overcoat layer improves wear resistance of the organic photoconductor drum without negatively altering the electrophotographic properties, thus protecting the organic photoconductor drum from damage and extending its service life.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

Figure 1:
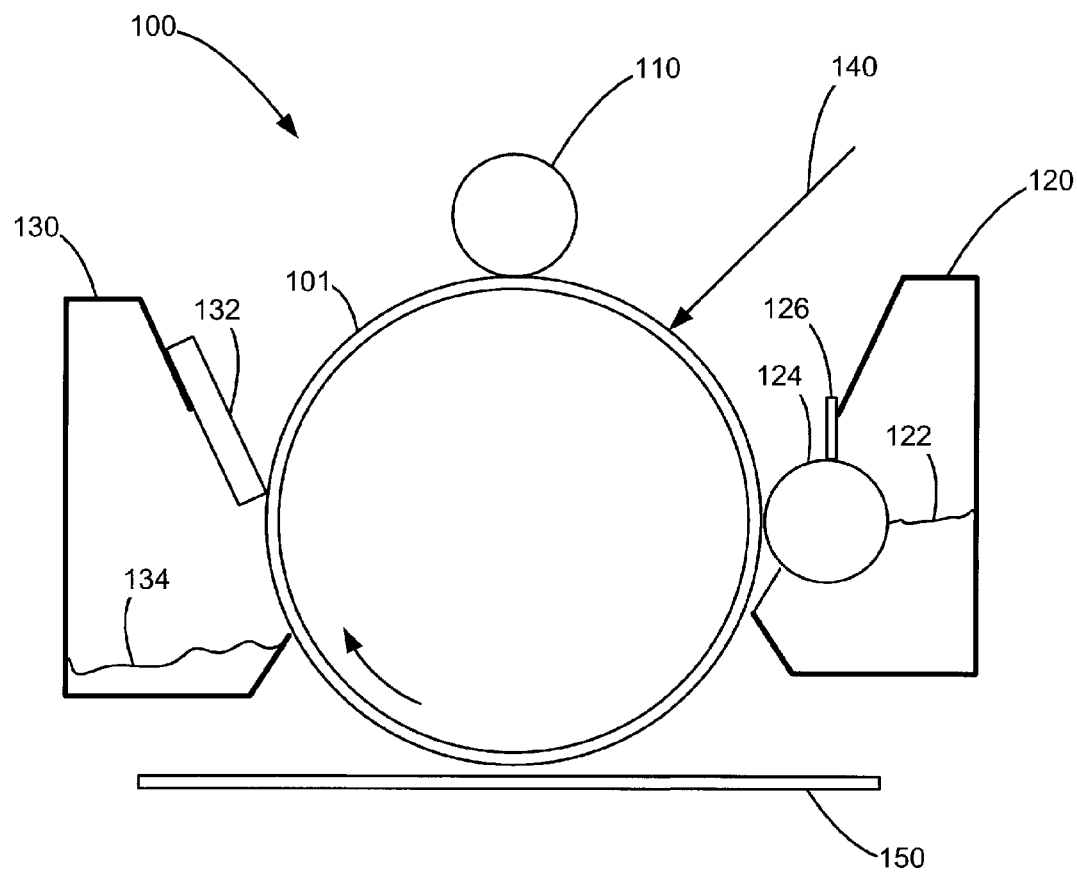
FIG. 1 is a schematic view of an electrophotographic image forming device.

It is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

FIG. 1 illustrates a schematic representation of an example electrophotographic image forming device 100. Image forming device 100 includes a photoconductor drum 101, a charge roll 110, a developer unit 120, and a cleaner unit 130. The electrophotographic printing process is well known in the art and, therefore, is described briefly herein. During a print operation, charge roll 110 charges the surface of photoconductor drum 101. The charged surface of photoconductor drum 101 is then selectively exposed to a laser light source 140 to form an electrostatic latent image on photoconductor drum 101 corresponding to the image being printed. Charged toner from developer unit 120 is picked up by the latent image on photoconductor drum 101 creating a toned image.

Developer unit 120 includes a toner sump 122 having toner particles stored therein and a developer roll 124 that supplies toner from toner sump 122 to photoconductor drum 101. Developer roll 124 is electrically charged and electrostatically attracts the toner particles from toner sump 122. A doctor blade 126 disposed along developer roll 124 provides a substantially uniform layer of toner on developer roll 124 for subsequent transfer to photoconductor drum 101. As developer roll 124 and photoconductor drum 101 rotate, toner particles are electrostatically transferred from developer roll 124 to the latent image on photoconductor drum 101 forming a toned image on the surface of photoconductor drum 101. In one example embodiment, developer roll 124 and photoconductor drum 101 rotate in the same rotational direction such that their adjacent surfaces move in opposite directions to facilitate the transfer of toner from developer roll 124 to photoconductor drum 101. A toner adder roll (not shown) may also be provided to supply toner from toner sump 122 to developer roll 124. Further, one or more agitators (not shown) may be provided in toner sump 122 to distribute the toner therein and to break up any clumped toner.

The toned image is then transferred from photoconductor drum 101 to print media 150 (e.g., paper) either directly by photoconductor drum 101 or indirectly by an intermediate transfer member. A fusing unit (not shown) fuses the toner to print media 150. A cleaning blade 132 (or cleaning roll) of cleaner unit 130 removes any residual toner adhering to photoconductor drum 101 after the toner is transferred to print media 150. Waste toner from cleaning blade 132 is held in a waste toner sump 134 in cleaning unit 130. The cleaned surface of photoconductor drum 101 is then ready to be charged again and exposed to laser light source 140 to continue the printing cycle.

The components of image forming device 100 are replaceable as desired. For example, in one example embodiment, developer unit 120 is housed in a replaceable unit with photoconductor drum 101, cleaner unit 130 and the main toner supply of image forming device 100. In another example embodiment, developer unit 120 is provided with photoconductor drum 101 and cleaner unit 130 in a first replaceable unit while the main toner supply of image forming device 100 is housed in a second replaceable unit. In another example embodiment, developer unit 120 is provided with the main toner supply of image forming device 100 in a first replaceable unit and photoconductor drum 101 and cleaner unit 130 are provided in a second replaceable unit. Further, any other combination of replaceable units may be used as desired. In some example embodiments, the photoconductor drum 101 is not replaceable and becomes a permanent component of the image forming device 100.

Figure 2:
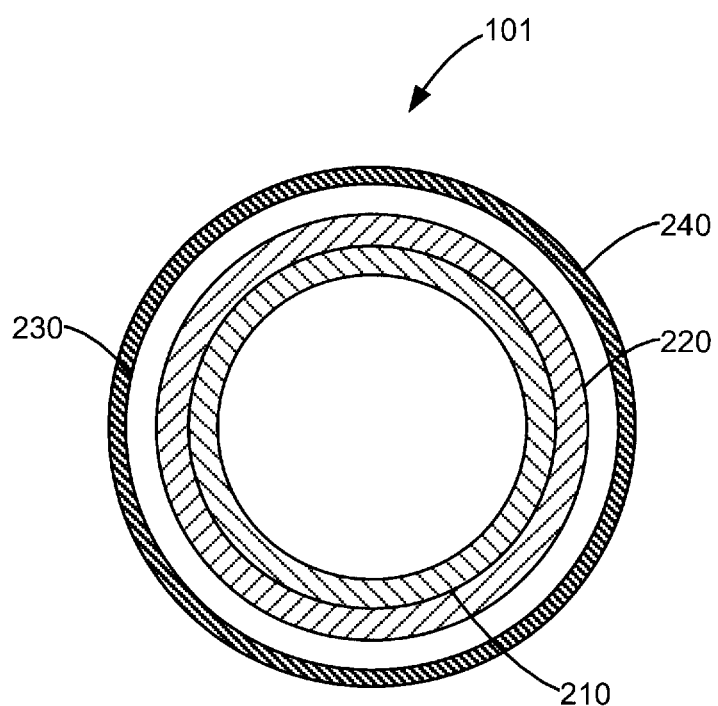
FIG. 2 is a cross-sectional view of a photoconductor drum of the electrophotographic image forming device.

FIG. 2 illustrates an example photoconductor drum 101 in more detail. In this example embodiment, the photoconductor drum 101 includes a support element 210, a charge generation layer 220 disposed over the support element 210, a charge transport layer 230 disposed over the charge generation layer 220, and a protective overcoat layer 240 formed as an outermost layer of the photoconductor drum 101. Additional layers may be included between the support element 210, the charge generation layer 220 and the charge transport layer 230, including adhesive and/or coating layers.

The support element 210, as illustrated in FIG. 2, is generally cylindrical. However, the support element 210 may assume other shapes or may be formed into a belt. In one example embodiment, the support element 210 may be formed from a conductive material, such as aluminum, iron, copper, gold, silver, etc. as well as alloys thereof. The surfaces of the support element 210 may be treated, such as by anodizing and/or sealing. In some example embodiments, the support element 210 may be formed from a polymeric material and coated with a conductive coating.

The charge generation layer 220 is designed for the photogeneration of charge carriers. The charge generation layer 220 may include a binder and a charge generation compound. The charge generation compound may be understood as any compound that may generate a charge carrier in response to light. In one example embodiment, the charge generation compound may comprise a pigment being dispersed evenly in one or more types of binders.

The charge transport layer 230 is designed to transport the generated charges. The charge transport layer 230 may include a binder and a charge transport compound. The charge transport compound may be understood as any compound that may contribute to surface charge retention in the dark and to charge transport under light exposure. In one example embodiment, the charge transport compounds may include organic materials capable of accepting and transporting charges.

In some example embodiments, the charge generation layer 220 and the charge transport layer 230 may be configured to combine in a single layer. In such configuration, the charge generation compound and charge transport compound are mixed in a single layer.

The overcoat layer 240 is designed to protect the photoconductor drum 101 from wear and abrasion without altering the electrophotographic properties, thus extending the service life of the photoconductor drum 101. The overcoat layer 240 may have a thickness of about 0.1 µm to about 10 µm. Specifically, the overcoat layer 240 may have a thickness of about 1 µm to about 6 µm, and more specifically a thickness of about 3 µm to about 5 µm. The thickness of the overcoat layer 240 may be kept at a range that will not provide adverse effects to the electrophotographic properties of the photoconductor drum 101.

The overcoat layer 240 includes a three-dimensional crosslinked structure formed from a curable composition. The curable composition includes a urethane acrylate functional charge transport molecules, and a photoinitiator. The curable composition may further include crosslinkable additives such as acrylates, diacrylates or urethane acrylates. In one example embodiment, the crosslinkable additive include hexa-functional aromatic urethane acrylate resin having the molecule of formula (A):

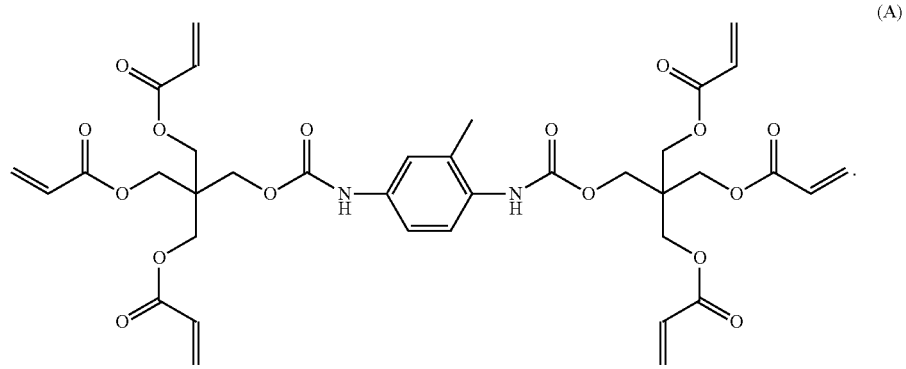 [SMILES: C=CC(=O)OCC(COC(=O)C=C)(COC(=O)C=C)COC(=O)Nc1ccc(NC(=O)OCC(COC(=O)C=C)(COC(=O)C=C)COC(=O)C=C)c(C)c1]

(A)

In some example embodiments, the crosslinkable additive includes hexa-functional aliphatic urethane acrylate resin having the molecule of formula (B):

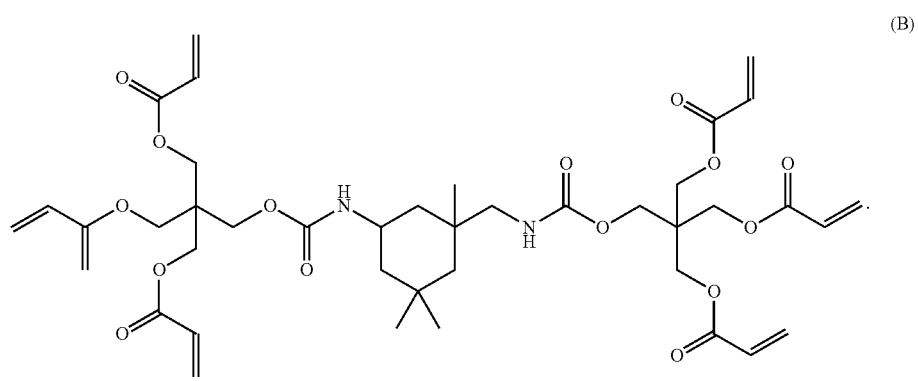 [SMILES: C=CC(=C)OCC(COC(=O)C=C)(COC(=O)C=C)COC(=O)NC1CC(C)(C)CC(C)(CNC(=O)OCC(COC(=O)C=C)(COC(=O)C=C)COC(=O)C=C)C1]

(B)

Urethane acrylates are most often used when a clear, thin, abrasion or impact resistant coating is required to protect an underlying structure. Consequently, urethane acrylates are most commonly deposited as thin films. Industrial applications include automotive and floor coatings with thicknesses ranging from tens to hundreds of microns. These overcoat applications on floor and automobiles, however, do not require a charge migration to occur. In an electrophotographic printer, such as a laser printer, an electrostatic image is created by illuminating a portion of the photoconductor surface in an image-wise manner. The wavelength of light used for this illumination is most typically matched to the absorption max of a charge generation material, such as titanylphthalocyanine. Absorption of light results in creation of an electron-hole pair. Under the influence of a strong electrical field, the electron and hole (radical cation) dissociate and migrate in a field-directed manner. Photoconductors operating in a negative charging manner moves holes to the surface and electrons to ground. The holes discharge the photoconductor surface, thus leading to creation of the latent image. Unfortunately, hexafunctional urethane acrylate resins lack any charge transporting properties, thus negatively limiting the thickness of the overcoat layer 240. With the presence of charge transport molecules in the overcoat layer 240, the thickness of the overcoat layer 240 may be increased without having significant adverse effects on the electrical properties of the photoconductor drum 101. Ultimately this overcoat formulation of the present invention leads to a photoconductor drum having an 'ultra long life', thereby allowing a consumer to successfully print at least 100,000 pages on their printer before a replacement photoconductor drum has to be purchased.

The urethane acrylate functional charge transport molecules are reaction product of hydroxyl functional charge transport molecules and a monomer having an isocyanate group and an acrylate group. Example of monomer having an isocyanate group and an acrylate group includes, but are not limited to, 2-isocyanatoethyl acrylate and 2-isocyanatoethyl methacrylate. The isocyanate group of the monomer reacts with the hydroxyl group of the hydroxyl functional charge transport molecule while leaving the acrylate group as a free radical of the formed urethane acrylate functional charge transport molecule. The urethane acrylate functional charge transport molecule is crosslinkable by ultraviolet (UV) in the presence of photoinitiator.

The hydroxyl functional charge transport molecules include di-hydroxy functional charge transport molecules, tri-hydroxy functional charge transport molecules, or tetra-hydroxy functional charge transport molecules. Examples of di-hydroxy functional charge transport molecules include the following compounds of formula (1) to formula (10):

-continued
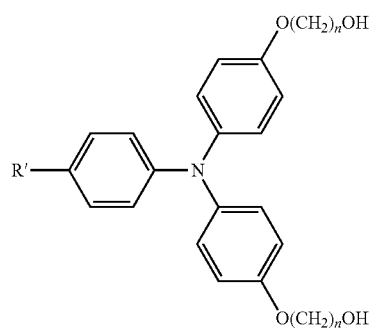
(1)
(2)
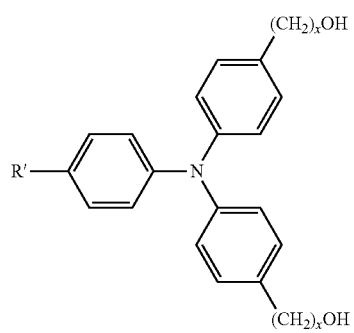
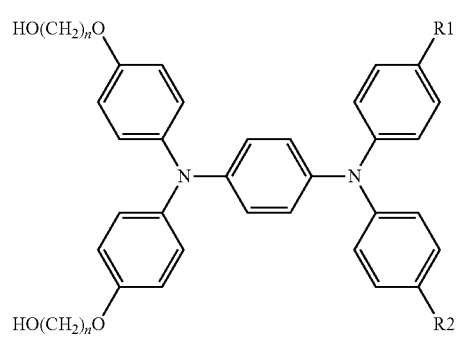
(3)
(4)
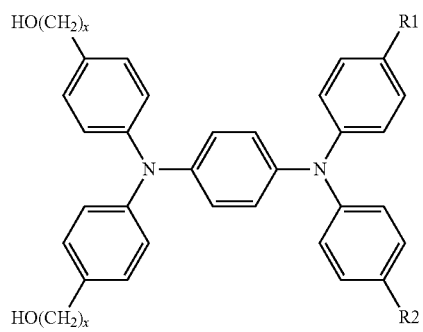
(5)
(6)
(7)
(8)

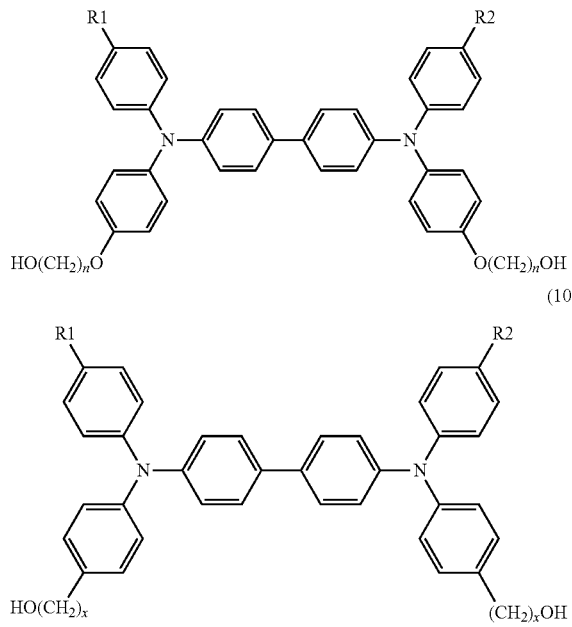

(9)

(10)

wherein x is equivalent to a whole number; n is equivalent to a counting number; R' is H or $CH_3$; R1 is H or $CH_3$; and R2 is H or $CH_3$.

Examples of tri-hydroxy functional charge transport molecules include the following compounds of formula (11) to formula (14):

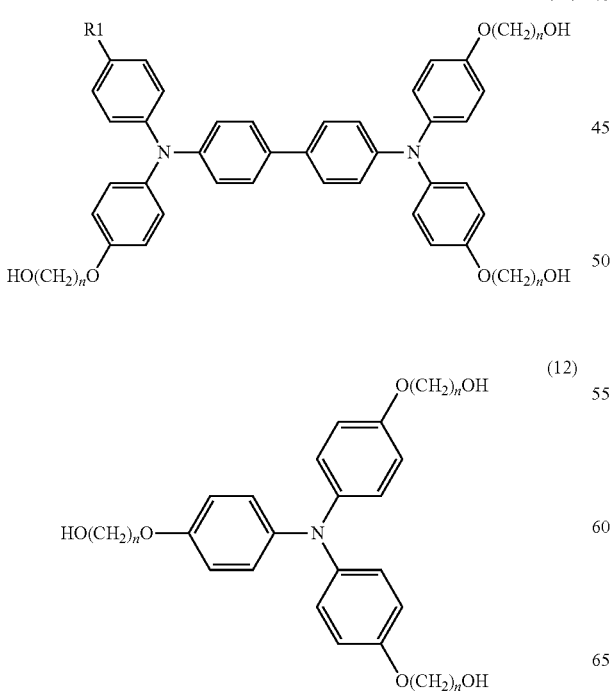

(11)

(12)

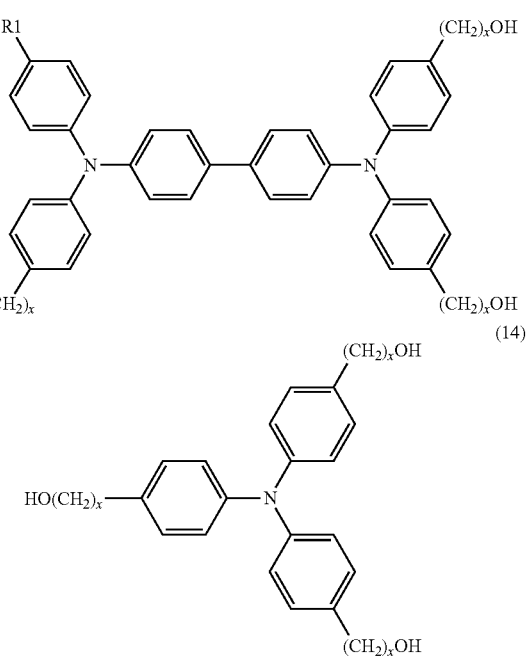

(13)

(14)

wherein x is equivalent to a whole number; n is equivalent to a counting number; and R1 is H or $CH_3$.

Examples of tetra-hydroxy functional charge transport molecules include the following compounds of formula (15) and formula (16):

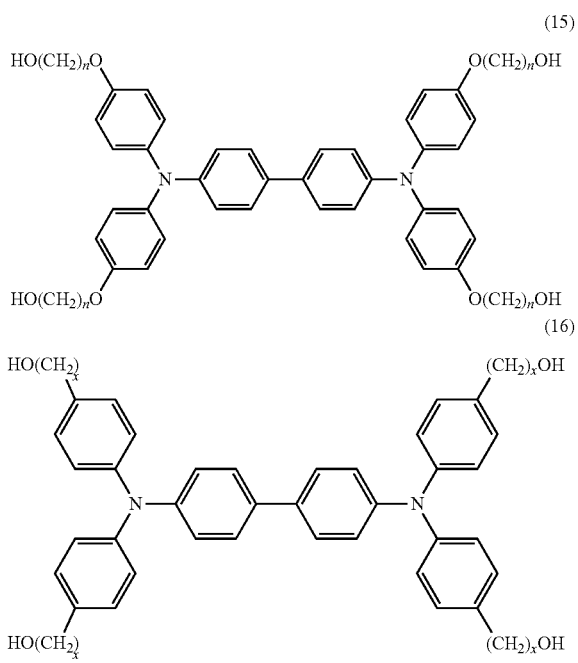

(15)

(16)

wherein x is equivalent to a whole number; and n is equivalent to a counting number.

Urethane acrylate functional charge transport molecules include, but are not limited to, tri-arylamine of formula (I) to formula (IV), tetra-aryl benzidine of formula (V) to formula (XII), and tetra-aryl phenylene diamine of formula (XIII) to formula (XVI).

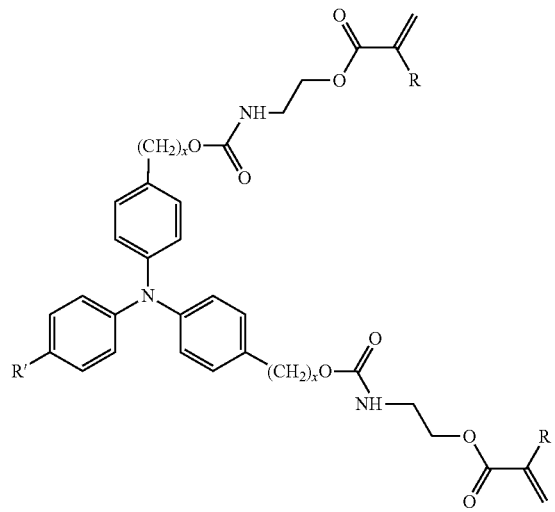
(I)
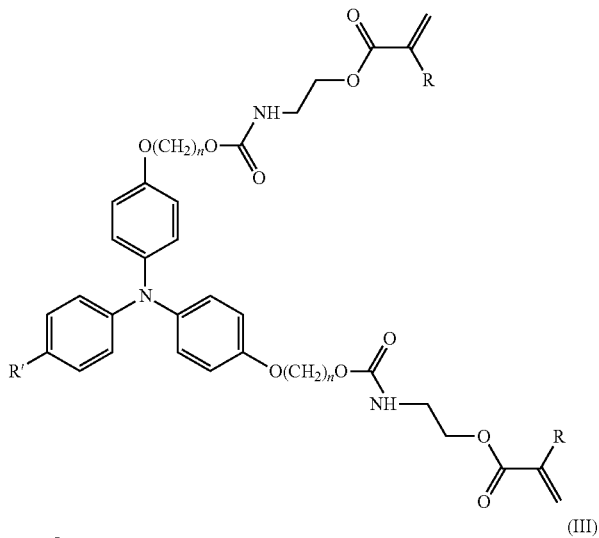
(II)
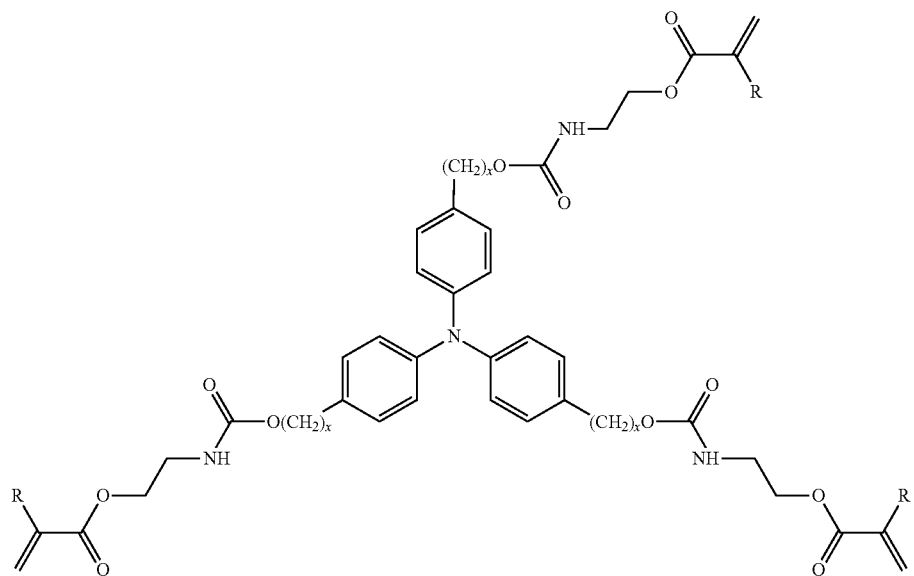
(III)
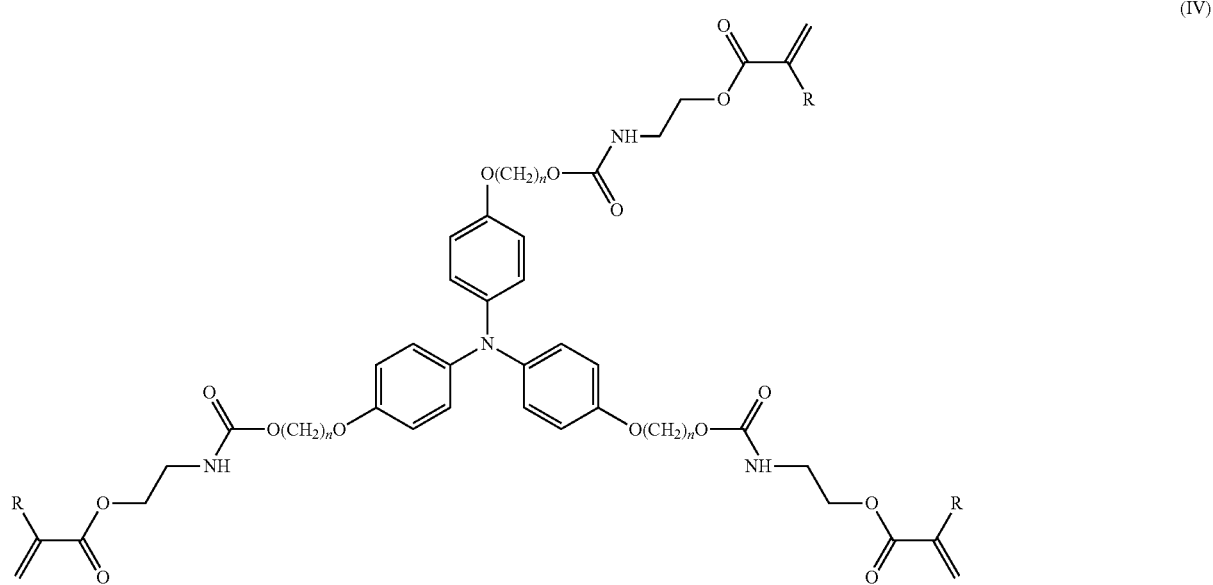
(IV)

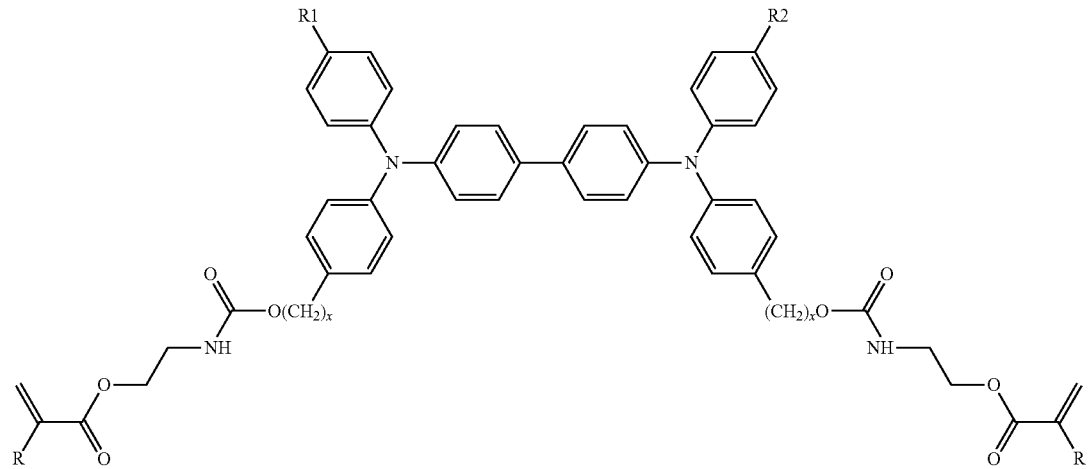
(V)
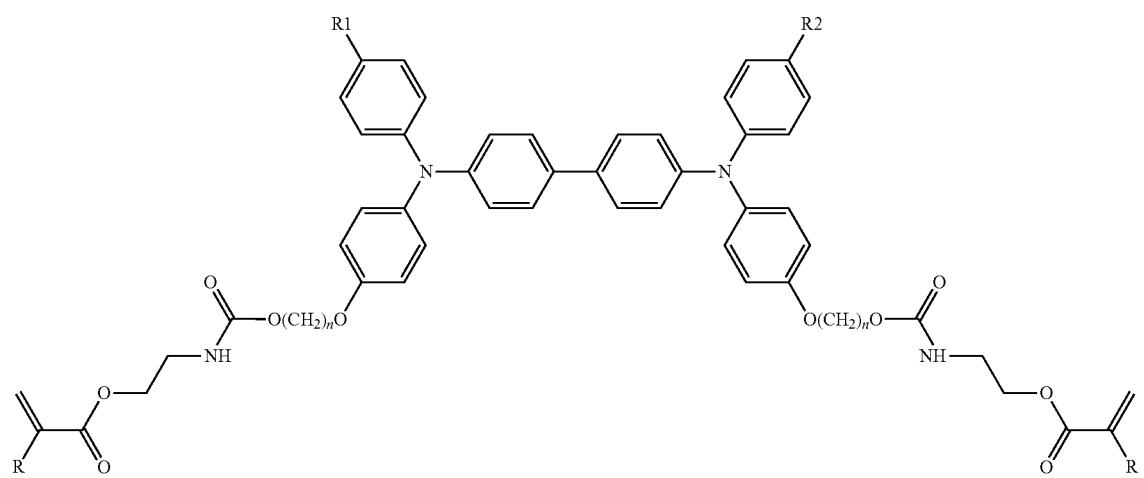
(VI)
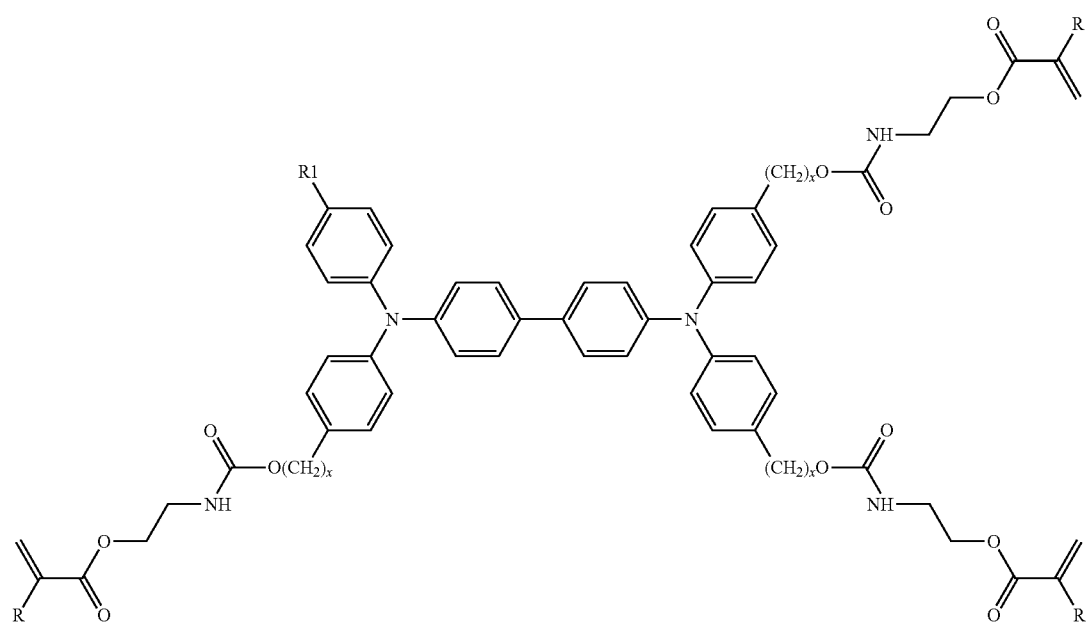
(VII)

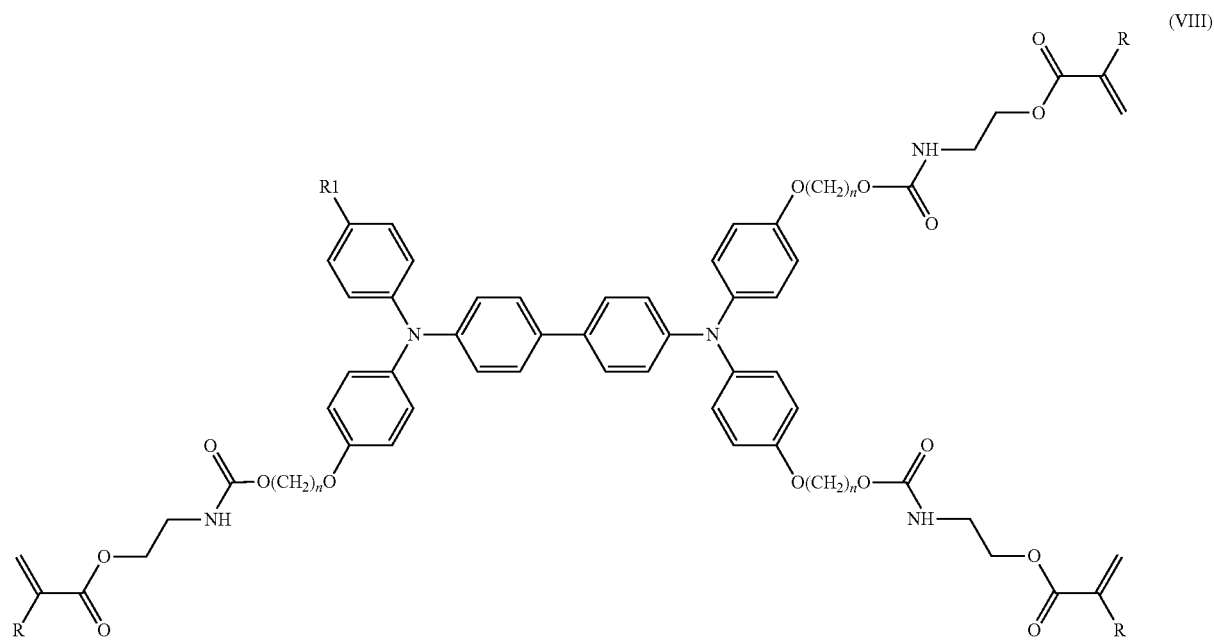
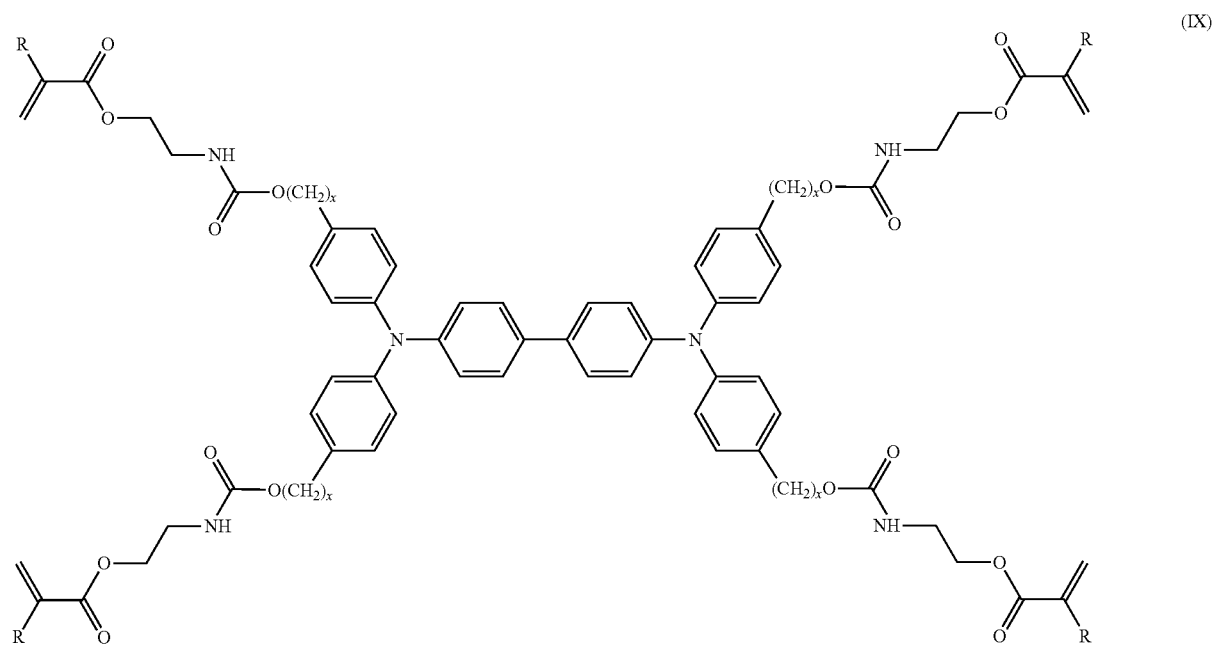

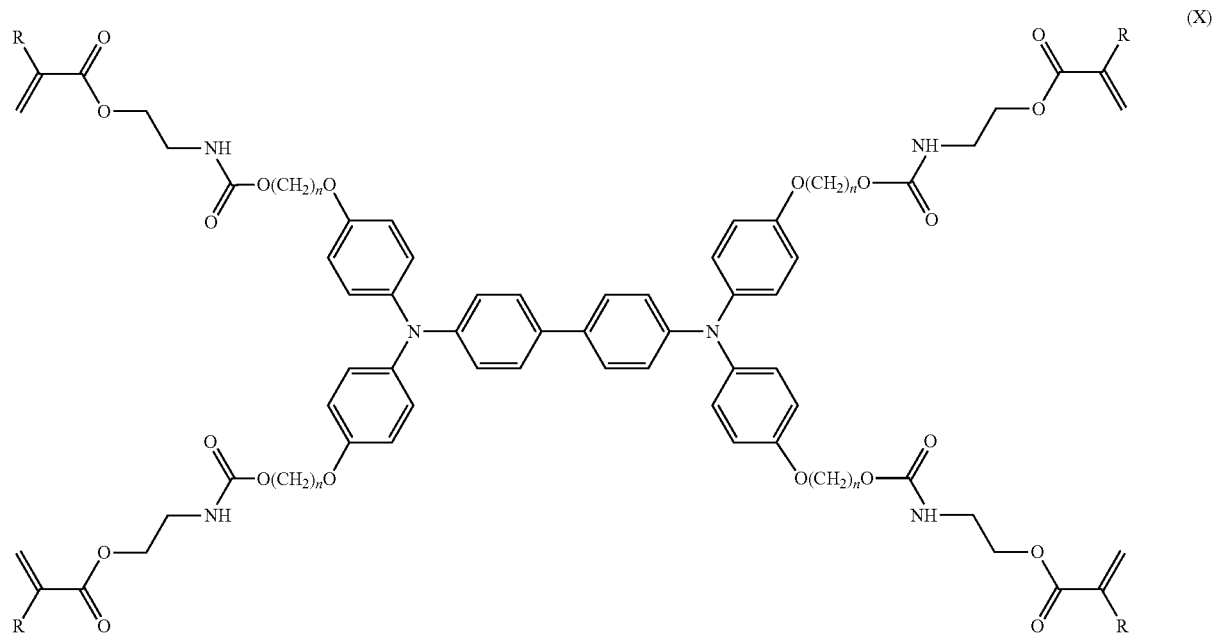
(X)
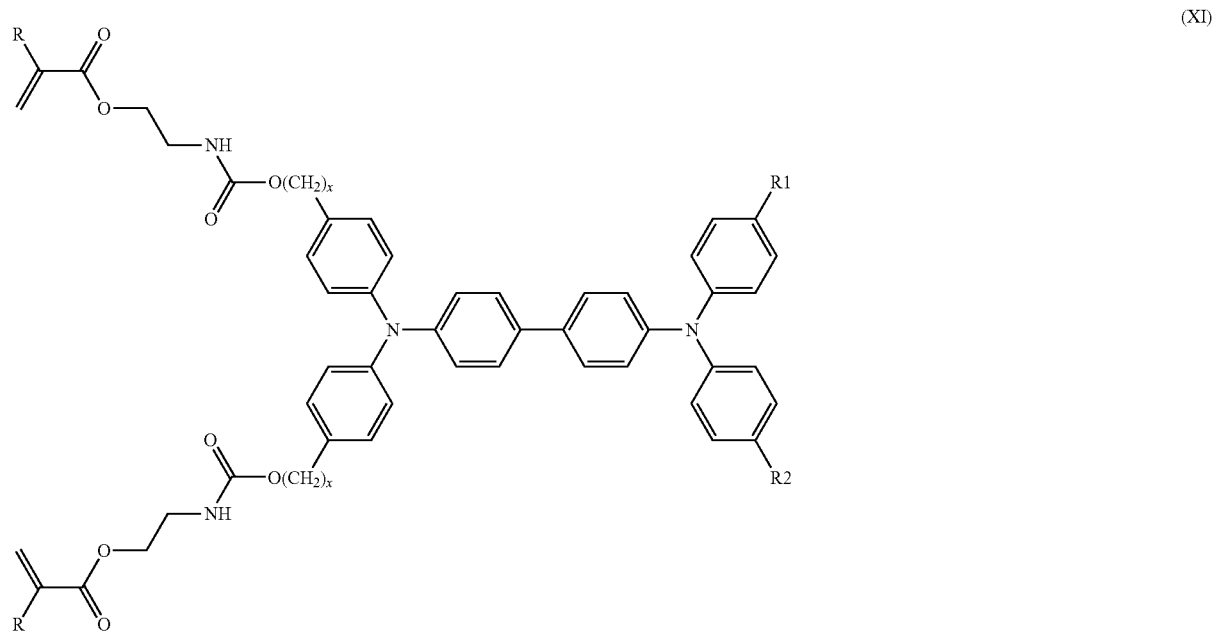
(XI)

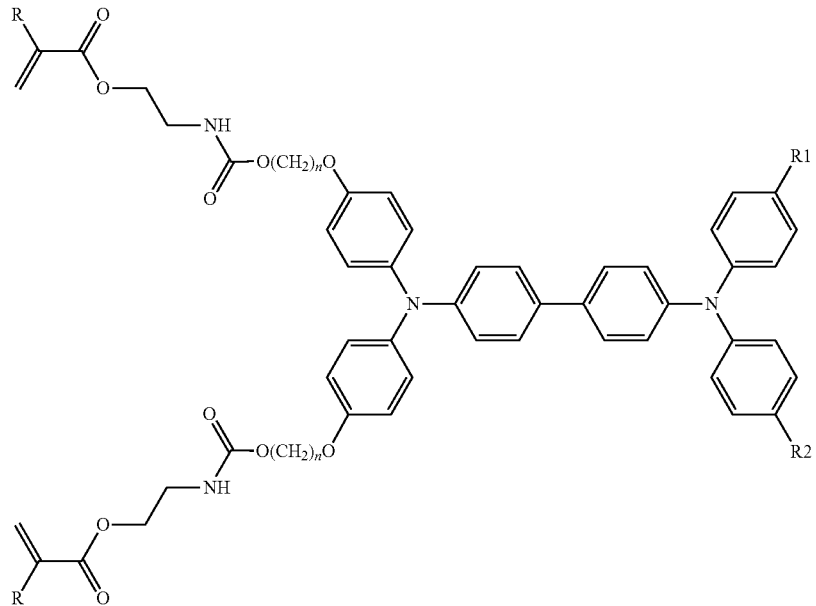
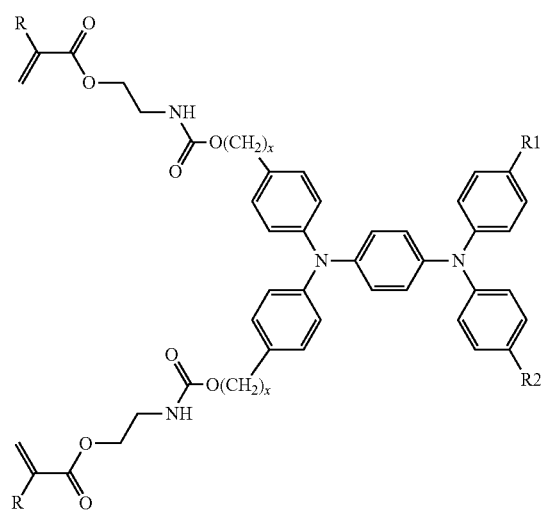
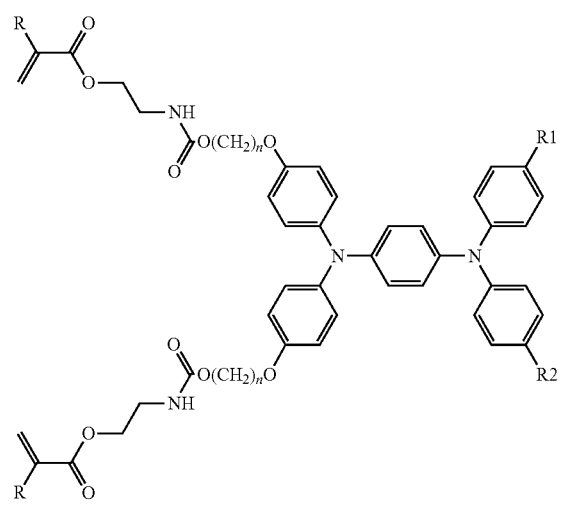
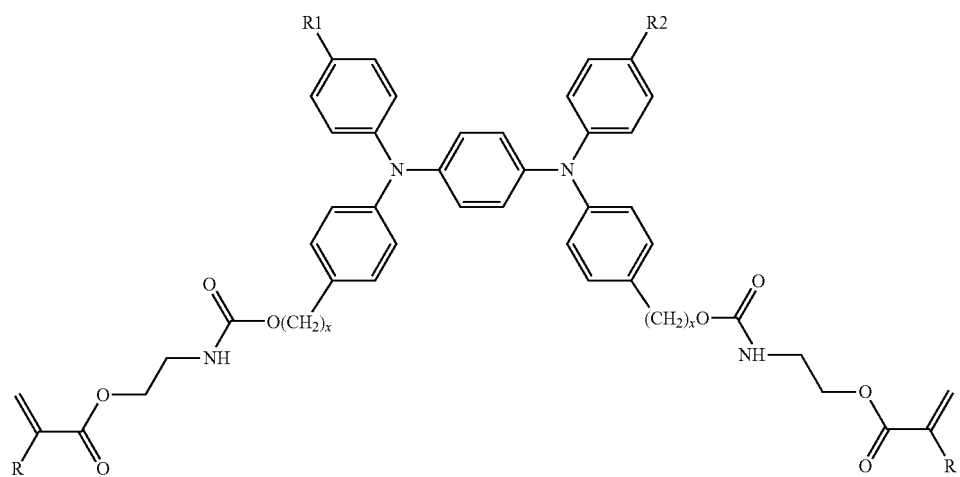

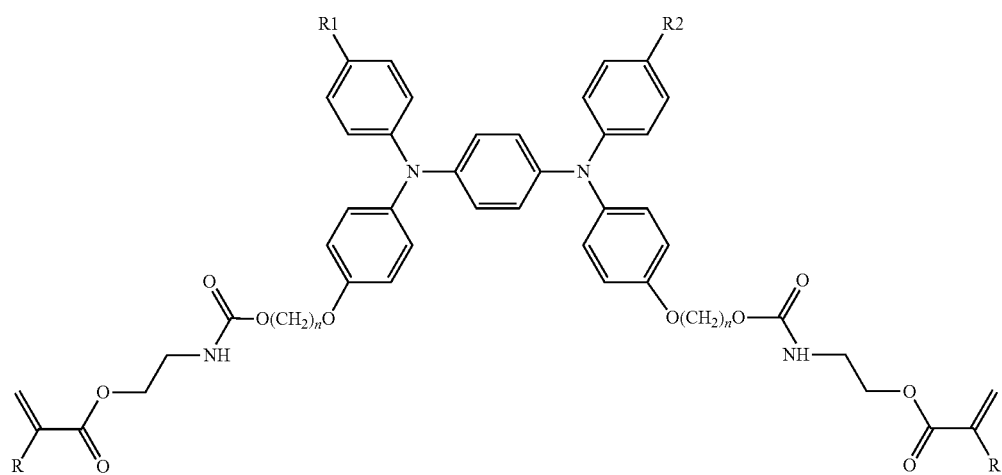

In one example embodiment, the urethane acrylate functional charge transport molecule is di-functional having the structure shown in formula (1), and produced by the reaction of di-hydroxy functional tri-arylamine charge transport molecule (2) with 2-isocyanatoethyl methacrylate or 2-isocyanatoethyl acrylate as illustrated in Equation 1,

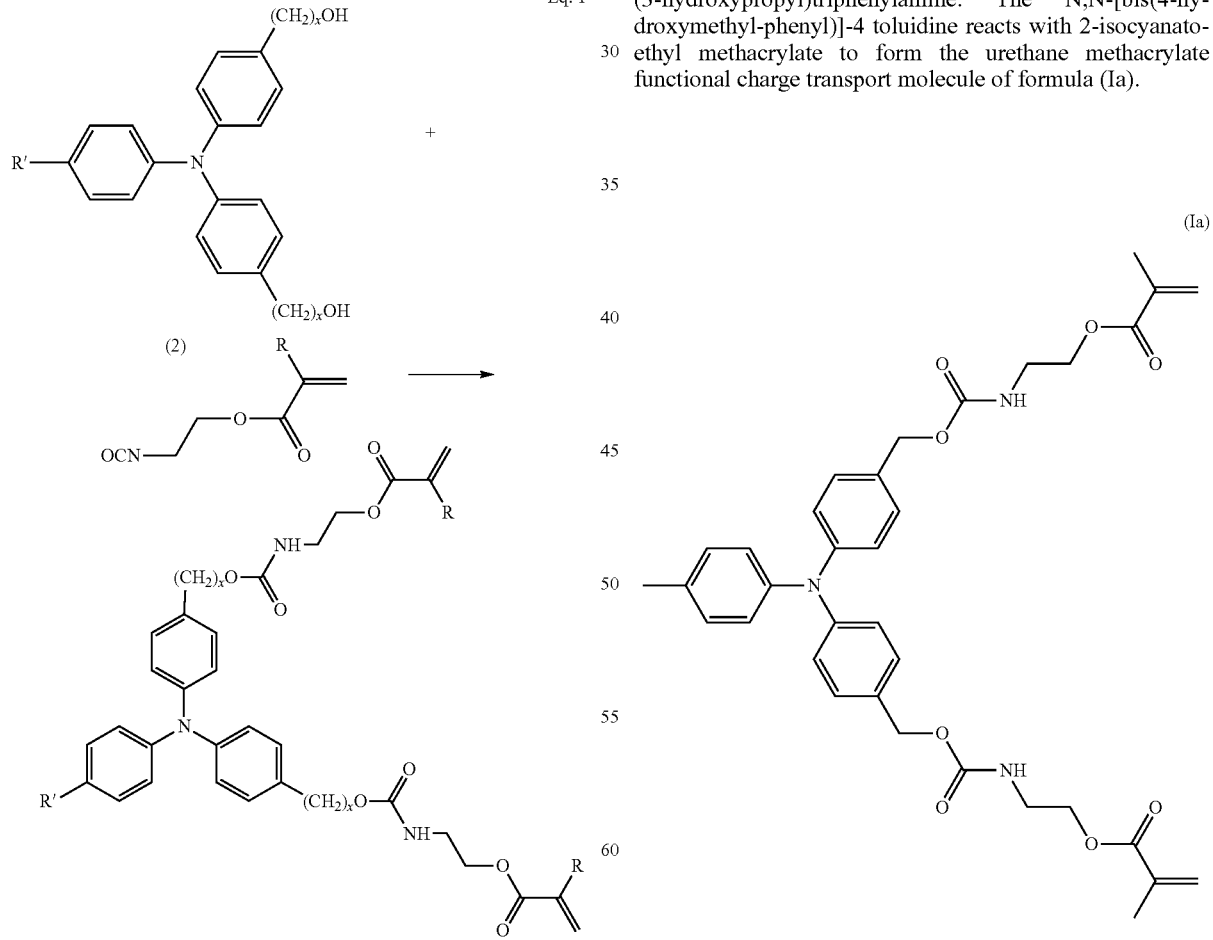

wherein x is equivalent to a whole number; R' is H or CH$_3$; and R is H or CH$_3$.

The di-hydroxy functional tri-arylamine charge transport molecule (2) in Equation 1 includes, but is not limited to, N,N-[bis(4-hydroxymethyl-phenyl)]-4-toluidine and 4,4'-di(3-hydroxypropyl)triphenylamine. The N,N-[bis(4-hydroxymethyl-phenyl)]-4 toluidine reacts with 2-isocyanatoethyl methacrylate to form the urethane methacrylate functional charge transport molecule of formula (Ia).

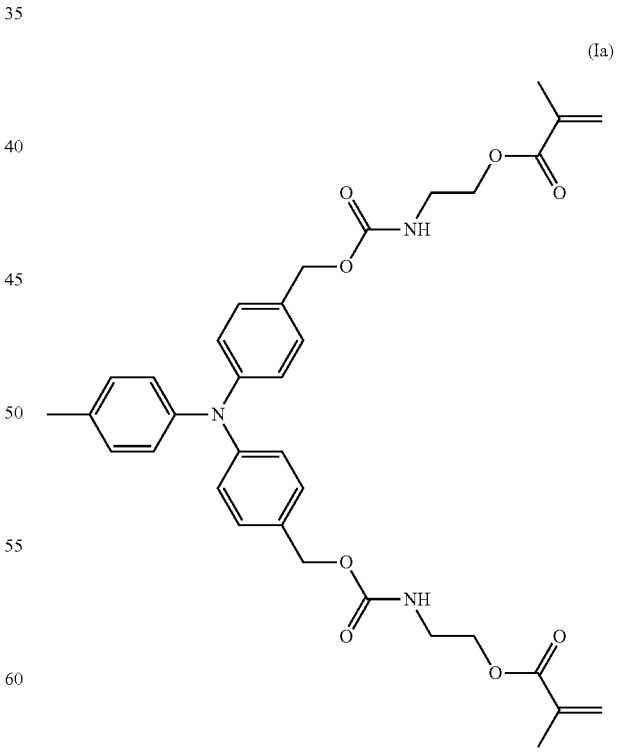

The 4,4'-di(3-hydroxypropyl)triphenylamine reacts with 2-isocyanatoethyl methacrylate to form the urethane methacrylate functional charge transport molecule of formula (Ib).

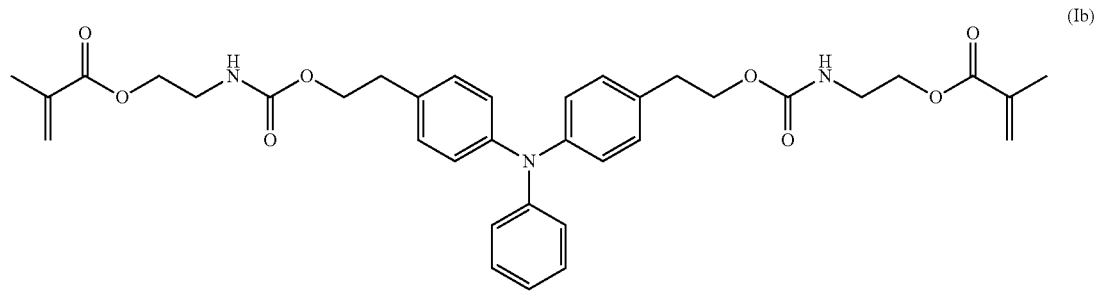 [SMILES: C=C(C)C(=O)OCCNC(=O)OCCc1ccc(N(c2ccccc2)c2ccc(CCOC(=O)NCCOC(=O)C(=C)C)cc2)cc1]

(Ib)

In another example embodiment, the urethane acrylate functional charge transport molecule is di-functional having the structure shown in formula (V), and produced by the reaction of di-hydroxy functional tetraphenyl benzidine charge transport molecule (10) with 2-isocyanatoethyl methacrylate or 2-isocyanatoethyl acrylate as illustrated in Equation 2.

wherein x is equivalent to a whole number; R is H or $CH_3$, R1 is H or $CH_3$, and R2 is H or $CH_3$.

The di-hydroxy functional tetraphenyl benzidine charge transport molecule (10) in Equation 2 includes, but is not limited to, N,N'-Diphenyl-N,N'-di(p-phenolyl)benzidine. The N,N'-Diphenyl-N,N'-di(p-phenolyl)benzidine reacts with 2-isocyanatoethyl methacrylate to form the urethane methacrylate functional charge transport molecule of formula (Va).

Eq. 2

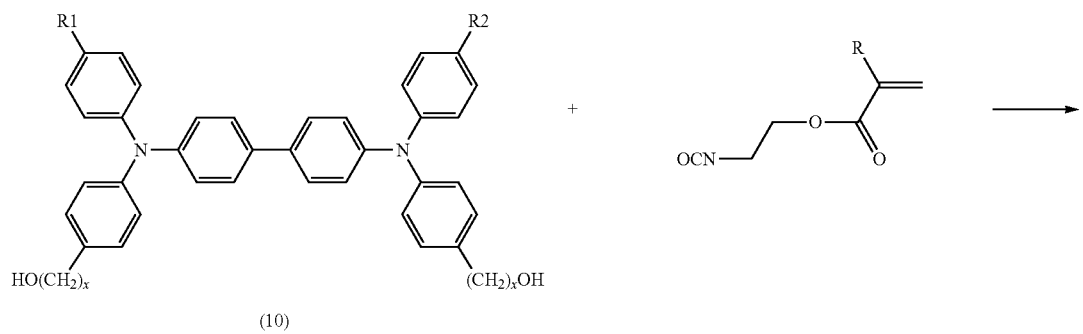

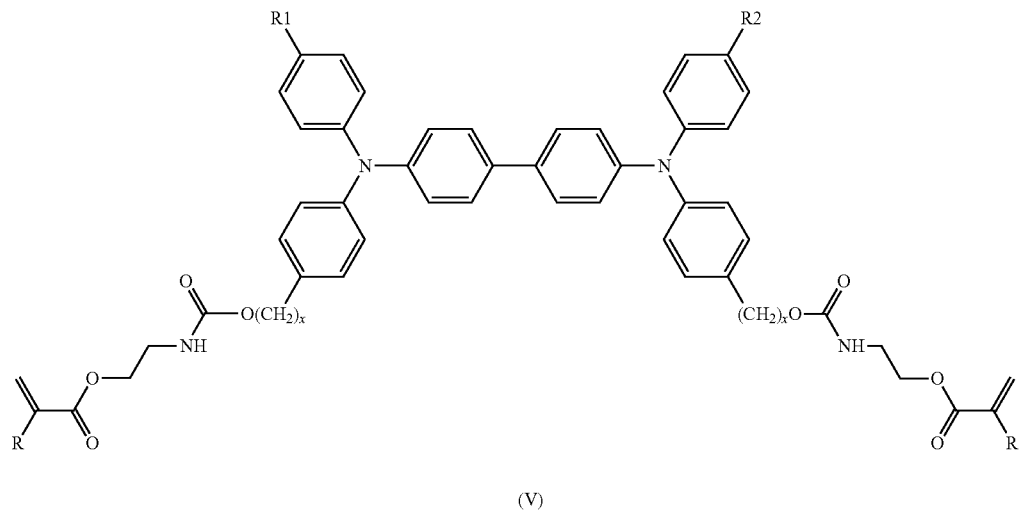

(V)

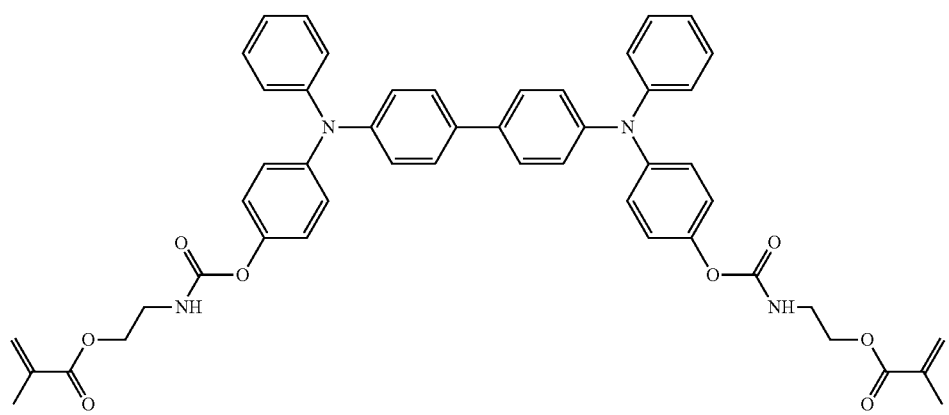
(Va)

In some other example embodiments, the urethane acrylate functional charge transport molecule is tri-functional having the structure of formula (III), and produced by the reaction of tri-hydroxy functional tri-arylamine charge transport molecule (14) with 2-isocyanatoethyl methacrylate or 2-isocyanatoethyl acrylate as illustrated in Equation 3.

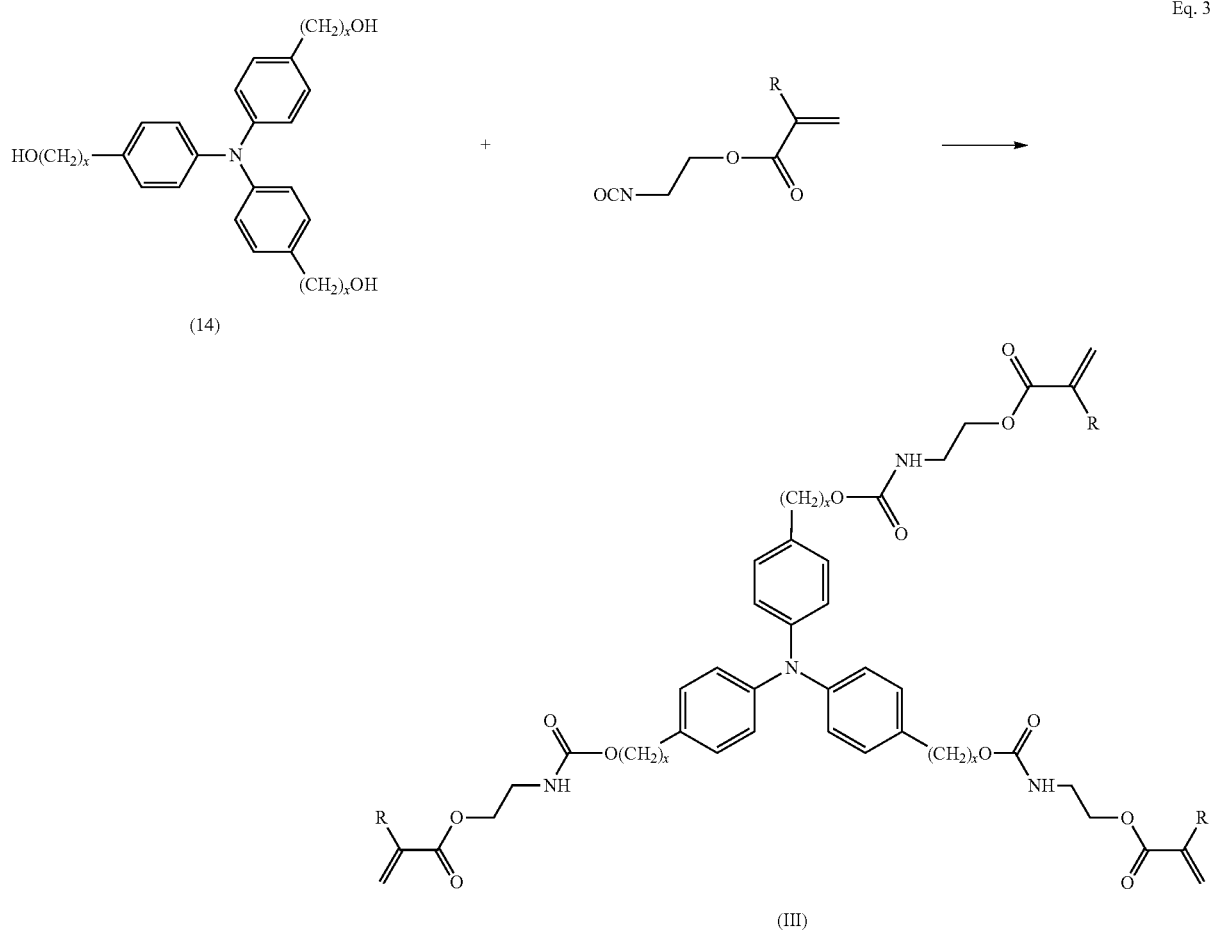

Eq. 3 wherein x is equivalent to a whole number; and R is H or $CH_3$.

The tri-hydroxy functional tri-arylamine charge transport molecule (14) in Equation 3 includes, but is not limited to, tris-(4-hydroxymethyl-phenyl)-amine. The tris-(4-hydroxymethyl-phenyl)-amine reacts with 2-isocyanatoethyl methacrylate to form the urethane methacrylate functional charge transport molecule of formula (IIIa).

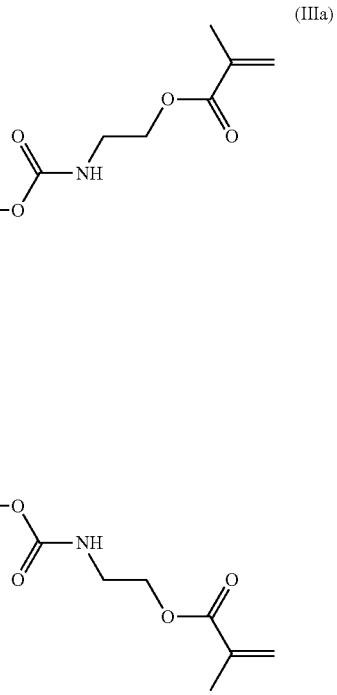

(IIIa)

The urethane acrylate functional charge transport molecules are prepared by mixing hydroxyl functional charge transport molecules and the monomer having isocyanate group and acrylate group in an organic solvent. The organic solvent includes, but is not limited to, tetrahydrofuran (THF). The mixture is purged by bubbling nitrogen gas through the mixture. The mixture is then added with a catalyst and stirred to react. The catalyst includes dibutyltin dilaurate. The catalyst may be in combination with hydroxylated tertiary amine starting material. The reaction mixture is stirred at room temperature or at a higher temperature under nitrogen environment. Higher temperature increases reaction yield. In one example embodiment, the reaction mixture is stirred at 60° C. under nitrogen environment.

Examples of photoinitiator include, but are not limited to, isobutyl benzoin ether; 2,4,6-trimethylbenzoyl, diphenylphosphine oxide; bis(2,4,6-trimethylbenzoyl)phenylphosphine oxide (sold as IRGACURE 819, available from Ciba, with a Chemical Abstracts Services (CAS) Registry Number of 162881-26-7); 1-hydroxycyclohexyl phenyl ketone (sold as GENOCURE CPK, available from Rahn); 2-benzyl-2-dimethylamino-1-(4-morpholinophenyl)-butan-1-one; 2,2-dimethoxy-2-phenylacetophenone; perfluorinated diphenyltitanocene; 2-methyl-1-[4-(methylthio)phenyl]-2-(4-morpholinyl)-1-propanone; 2-hydroxy-2-methyl-1-phenylpropan-1-one; 4-(2-hydroxyethoxy)phenyl-2-hydroxy-2-propyl ketone dimethoxyphenylacetophenone; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-2-(2-hydroxy-2-propyl)-ketone (sold as IRGACURE 2959, available from Ciba, with CAS Registry Number of 106797-53-9); diethoxyphenyl acetophenone; a mixture of (2,6-dimethoxybenzoyl)-2,4,4-trimethylpentylphosphine oxide and 2-hydroxy-2-methyl-1-phenyl-propan-1-one; benzophenone; 1-propanone, 2-methyl-1-1-(4-(methylthio)phenyl)$_2$(4-morpholinyl); and mixtures thereof.

The formed urethane acrylate functional charge transport molecules may be separated from the reaction mixture. Separation may be through solvent extraction or precipitation. In preparing the curable composition for the overcoat layer, the separated urethane acrylate functional charge transport molecules are diluted with organic solvent and added with photoinitiator. The organic solvent used for diluting includes, but is not limited to, THF, isopropanol or combinations thereof. In some example embodiments, the curable composition is prepared by adding the photoinitiator directly to the reaction mixture containing the formed urethane acrylate functional charge transport molecules. The curable composition is then coated on a substrate, heated and exposed to UV light to form a very tough coating.

EXAMPLES

Chemical Synthesis of Urethane Methacrylate Functional Charge Transport Molecule of Formula (Ia)

N,N-[bis(4-hydroxymethyl-phenyl)]-4-toluidine (0.06 mol) was mixed with 2-isocyanatoethyl methacrylate (0.127 mol) at a mole ratio of about 1:2 in 70 mL of THF solvent. The mixture was purged by bubbling nitrogen gas through the mixture for 5 minutes. The mixture was then added with dibutyltin dilaurate catalyst (0.003 mmol), heated to 60° C., and stirred overnight under nitrogen environment for about 15 hours. The reaction mixture was then added with 2-isopropanol solvent (150 mL) to precipitated a white product (Product Ia). The white product was isolated by filtration as a white powder (40 g).

Preparation of Urethane Methacrylate Functional Charge Transport Molecule of Formula (Ia) into Coating A 0.2 g of Product Ia was dissolved in 2 mL of THF and mixed with 0.01 grams of 1-hydroxycyclohexyl phenyl ketone photoinitiator (sold under trade designation GENOCURE CPK from Rahn) to obtain a curable solution. A film was cast by applying a small amount of the curable solution (0.5 mL) onto a glass slide, drying for 5 minutes at 60° C., and curing with a 600 watt UV lamp for 5 seconds. A clear transparent coating being no longer soluble in THF was obtained.

Chemical Synthesis of Urethane Methacrylate Functional Charge Transport Molecule of Formula (Ib)

4,4'-di(3-hydroxypropyl)triphenylamine (17.7 mmol) was mixed with 2-isocyanatoethyl methacrylate (35.4 mmol) at a mole ratio of 1:2 in 54 mL of THF solvent. The mixture was purged by bubbling nitrogen gas through the mixture for 5 minutes. The mixture was then added with dibutyltin dilaurate catalyst (0.006 mmol), and stirred overnight under nitrogen environment. The reaction mixture was then concentrated to yield approximately 11.9 grams of a brown viscous oil (Product Ib). A portion of the obtained Product Ib was then sampled, dried with air at room temperature, and analyzed through nuclear magnetic resonance spectroscopy (NMR). The NMR analysis confirms that the obtained product has the structure of urethane methacrylate functional charge transport molecule of formula (Ib).

Preparation of Urethane Methacrylate Functional Charge Transport Molecule of Formula (Ib) as Overcoat Layer of a Photoconductor Drum Approximately 2.5 grams of the obtained Product Ib was mixed with 2.5 grams of hexa-functional aliphatic urethane acrylate resin and diluted in 45 grams of isopropanol. A small amount of GENOCURE CPK photoinitiator (0.25 g) was dissolved in the mixture to obtain a UV curable composition. A manufactured photoconductor drum having a titanyl phthalocyanine charge generation layer and a N,N'-bis(3-methylphenyl)-N,N'-diphenylbenzidine (TPD) charge transport layer with a polycarbonate resin binder, was half overcoated with the UV curable composition through dip coating. The overcoat was dried for 5 minutes at 60° C., and then cured with a 600 watt UV lamp with drum rotation for 5 seconds. A clear transparent overcoat being no longer soluble in THF was obtained.

The urethane methacrylate functional charge transport molecule of formula (Ib) as overcoat layer was evaluated. The Eddy thickness measurement indicated that the formed overcoat layer has a thickness of about 1.8 μm. An offline electrical analysis indicated that charge transport properties still exist for the overcoated portion of the photoconductor drum. The overcoated portion of the photoconductor drum has a discharge voltage of −344 while the non-overcoated portion has a discharge voltage of −307. Ideally, similar value of discharge voltages for overcoated and non-overcoated portions of the photoconductor drum will indicate that the coating composition does not affect electrical properties of the photoconductor drum. However, there are other factors that influence the discharge voltage of the photoconductor drum. The difference of the discharge voltage value of the overcoated portion with the non-overcoated portion may be due to the additional thickness of the overcoat layer. Also, the discharge voltage value of −344 volts for the overcoated portion is not too far off from the discharge voltage value of −307 volts for the non-overcoated portion. The overcoat layer has a voltage loss impact of 20.6 volts per micron. So, the electrical properties of the photoconductor drum are minimally impacted by the application of the overcoat layer.

The half overcoated photoconductor drum was tested for wear performance in a printer run at 50 pages-per-minute (ppm). After printing 20,000 pages, minimal thickness of the overcoat layer was worn away. Analysis indicated a loss of 0.2 μm, which represents a wear rate of 0.01 μm/1000-pages. In comparison, the non-overcoated portion of the photoconductor drum had a much higher wear rate of 0.19 μm/1000-pages losing 3.8 μm of thickness.

Chemical Synthesis of Urethane Methacrylate Functional Charge Transport Molecule of Formula (Va)

N,N'-Diphenyl-N,N'-di(p-phenolyl)benzidine (1.8 mmol) was mixed with 2-isocyanatoethyl methacrylate (3.5 mmol) at a mole ratio of about 1:2 in 10 mL of THF solvent. The mixture was purged by bubbling nitrogen gas through the mixture for 5 minutes. The mixture was then added with dibutyltin dilaurate catalyst (0.003 mmol) and stirred overnight under nitrogen environment. The reaction mixture was then concentrated and added with mixture of isopropyl alcohol (IPA)/hexane to precipitate the product yielding approximately 1.5 grams of Product Va. A portion of the obtained Product Va was then sampled, dried with air at room temperature, and analyzed through NMR. The NMR analysis confirms that the obtained product has the structure of urethane methacrylate functional charge transport molecule of formula (Va).

Preparation of Urethane Methacrylate Functional Charge Transport Molecule of Formula (Va) as Overcoat Layer (1) of a Photoconductor Drum Approximately 5 grams of Product Va was diluted in 45 grams of a 1:1 mixture by weight of THF/isopropanol solvents. A small amount of GENOCURE CPK photoinitiator (0.25 g) was dissolved in the mixture to obtain a UV curable composition. The manufactured photoconductor drum having titanyl phthalocyanine charge generation layer and TPD charge transport layer with polycarbonate resin binder was half overcoated with the UV curable composition through spray coating. The overcoat was dried for 5 minutes at 60° C., and then cured with a 600 watt UV lamp with drum rotation for 5 seconds. A clear transparent overcoat being no longer soluble in THF was obtained.

The urethane methacrylate functional charge transport molecule of formula (Va) as overcoat layer (1) was evaluated. The Eddy thickness measurement indicated that the formed overcoat layer has a thickness of about 2.0 μm. The offline electrical analysis indicated that charge transport properties still exist for the overcoated portion of the photoconductor drum. The overcoated portion of the photoconductor drum has a discharge voltage of −302 while the non-overcoated portion has a discharge voltage of −285. The discharge voltage value of the overcoated portion is not too far off from the discharge voltage value of the non-overcoated portion. The formed overcoat layer provides a voltage loss impact of 8.5 volt per micron to the photoconductor drum. So, the electrical properties of the photoconductor drum are minimally impacted by the application of the overcoat layer.

The half overcoated photoconductor drum was tested for wear performance in the printer run at 50 ppm. After printing 12,500 pages, less than half of the thickness of the overcoat layer was worn away. The overcoat layer has a wear rate of 0.07 μm/1000-pages. In comparison, the non-overcoated portion of the photoconductor drum had a much higher wear rate of 0.18 μm/1000-pages.

Preparation of Urethane Methacrylate Functional Charge Transport Molecule of Formula (Va) as Overcoat Layer (2) of a Photoconductor Drum Approximately 2.5 grams of Product Va was mixed with 2.5 grams of hexa-functional aliphatic urethane resin, and diluted in 45 grams of 1:1 mixture by weight of THF/isopropanol solvents. A small amount of GENOCURE CPK photoinitiator (0.25 g) was dissolved in the mixture to obtain a UV curable composition. The manufactured photoconductor drum having titanyl phthalocyanine charge generation layer and TPD charge transport layer with polycarbonate resin binder, was half overcoated with the UV curable composition through spray coating. The overcoat was dried for 5 minutes at 60° C., and then cured with the 600 watt UV lamp with drum rotation for 5 seconds. A clear transparent overcoat being no longer soluble in THF was obtained.

The urethane methacrylate functional charge transport molecule of formula (Va) as overcoat layer (2) was evaluated. The Eddy thickness measurement indicated that the formed overcoat layer has a thickness of about 3.3 μm. The offline electrical analysis indicated that charge transport properties still exist for the overcoated drum. The overcoated portion of the photoconductor drum has a discharge voltage of −387 while the non-overcoated portion has a discharge voltage of −302. The formed overcoat layer provides a voltage loss impact of 25.7 volts per micron to the photoconductor drum. Thus, the formed overcoat layer has a minimal impact to the electrical properties of the photoconductor drum.

The half overcoated photoconductor drum was tested for wear performance in the printer run at 50 ppm. After printing 40,000 pages, minimal thickness of the overcoat layer was worn away. Analysis indicated a loss of 0.28 μm, which represents a wear rate of 0.007 μm/1000-pages. In comparison, the non-overcoated portion of the drum had a much higher wear rate of 0.18 μm/1000-pages losing approximately 7.0 μm of thickness.

Chemical Synthesis of Urethane Methacrylate Functional Charge Transport Molecule of Formula (Ma)

Tris-(4-hydroxymethyl-phenyl)-amine (2.4 mmol) was mixed with 2-isocyanatoethyl methacrylate (7.1 mmol) at a mole ratio of about 1:3 in 30 mL of THF solvent. The mixture was purged by bubbling nitrogen gas through the mixture for 5 minutes. The mixture was then added with dibutyltin dilaurate catalyst (0.003 mmol) in combination with hydroxylated tertiary amine starting material. The hydroxylated tertiary amine starting material self catalyzes the reaction. The mixture was stirred at room temperature for 3 days under nitrogen environment to yield approximately 1.9 grams of clear viscous oil (Product IIIa). A portion of the obtained Product Va was then sampled, dried with air at room temperature, and analyzed through NMR. The NMR analysis confirms that the obtained product has the structure of urethane methacrylate functional charge transport molecule of formula (IIIa).

Preparation of Urethane Methacrylate Functional Charge Transport Molecule Of Formula (IIIa) into Coating A 3.0 mL of Product Va was mixed with 0.01 grams of GENOCURE CPK photoinitiator to obtain a UV curable composition. A film was cast by applying a small amount of the UV curable composition (0.5 mL) onto a glass slide, drying for 5 minutes at 60° C., and curing with the 600 watt UV lamp for 5 seconds. A slightly yellow transparent coating being no longer soluble in THF was obtained.

Preparation of Urethane Methacrylate Functional Charge Transport Molecule of Formula (IIIa) as Overcoat Layer of a Photoconductor Drum Approximately 15 mL of Product Va was diluted with 7.5 mL of isopropanol. A small amount of GENOCURE CPK photoinitiator (0.01 g) was dissolved in the mixture to obtain a UV curable composition. The manufactured photoconductor drum having titanyl phthalocyanine charge generation layer and TPD charge transport layer with polycarbonate resin binder, was overcoated with the UV curable composition by dripping the UV curable composition onto the surface of the drum while rotating. The overcoated drum was dried for 5 minutes at 60° C., and then cured with the 600 watt UV lamp with drum rotation for 3 seconds. A clear transparent overcoat being no longer soluble in THF was obtained.

Figure 3:
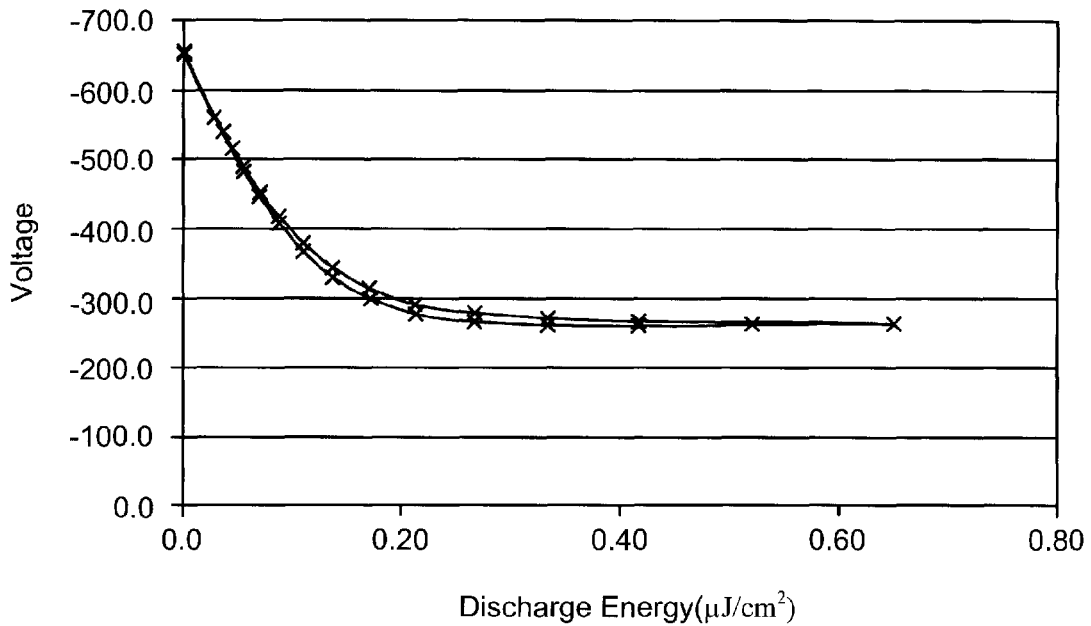
FIG. 3 is a graphical representation of an off-line electrical analysis of the photoconductor with an overcoat layer formed from urethane acrylate charge transport molecules.

The urethane methacrylate functional charge transport molecule of formula (IIIa) as overcoat layer was evaluated. The Eddy thickness measurement indicated that the formed overcoat layer has a thickness of about 2.0 μm. The offline electrical analysis indicated that the charge transport properties still exist for the overcoated drum. FIG. 3 illustrates a photoinduced discharge curve for the overcoated drum charged to −650 volts. The curve illustrates that the drum acts as a photoconductor, exhibiting a fairly standard discharge curve upon exposure to visible light of varying energy. The formed overcoat layer protects the photoconductor drum from wear without having adverse effect to the electrical properties of the photoconductor drum.

Comparative Example

Preparation of Overcoat Layer Without Charge Transport Properties

A 10 parts by weight of urethane acrylate, commercially available under trade designation EBECRYL 220 from Cytec, was mixed with 90 parts by weight of THF and 5 parts by weight of GENOCURE CPK photoinitiator to obtain a UV curable composition. The manufactured photoconductor drum having titanyl phthalocyanine charge generation layer and TPD charge transport layer with polycarbonate resin binder, was overcoated with the UV curable composition by dripping the UV curable composition onto the surface of the drum while rotating. The overcoat was dried for 5 minutes at 60° C., and then cured with the 600 watt UV lamp with drum rotation for 2 seconds. A clear transparent overcoat being no longer soluble in THF was obtained.

Figure 4:
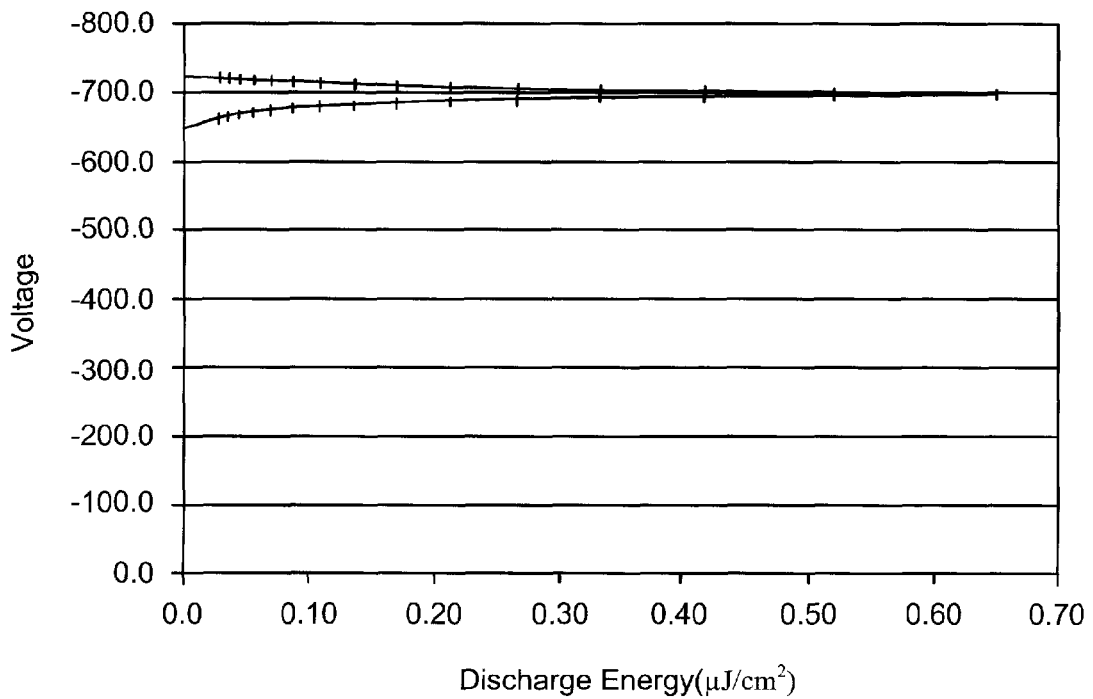
FIG. 4 is a graphical representation of an off-line electrical analysis of the photoconductor drum with an overcoat layer without charge transport properties.

The overcoat layer without charge transport properties was evaluated. The Eddy thickness measurement indicated that the formed overcoat layer has a thickness of about 2.0 μm. FIG. 4 illustrates an offline electrical analysis of the photoconductor drum coated with the overcoat layer without charge transport properties. As shown in FIG. 4, the photoconductor drum no longer discharge.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. An overcoat layer for an organic photoconductor drum, the overcoat layer prepared from a curable composition comprising:
   a urethane acrylate functional charge transport molecule that is a reaction product of hydroxyl functional charge transport molecule and a monomer having an isocyanate group and an acrylate group; and
   a photoinitiator.

2. The overcoat layer of claim 1, wherein the hydroxyl functional charge transport molecule is selected from the group consisting of a di-hydroxy functional charge transport molecule, a tri-hydroxy functional charge transport molecule, and a tetra-hydroxy functional charge transport molecule.

3. The overcoat layer of claim 1, wherein the urethane acrylate functional charge transport molecule comprises triarylamine of formulae (I)-(IV):
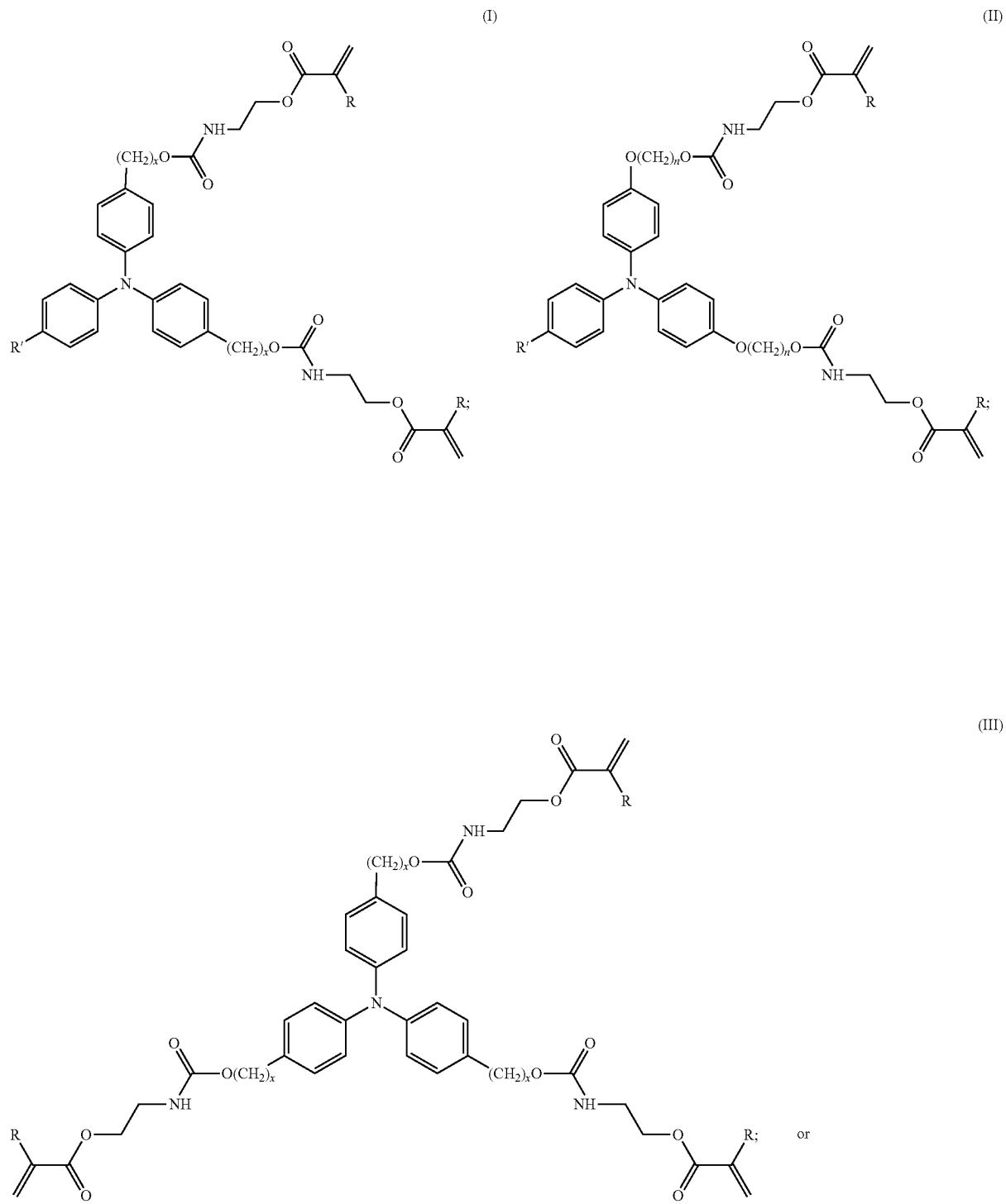

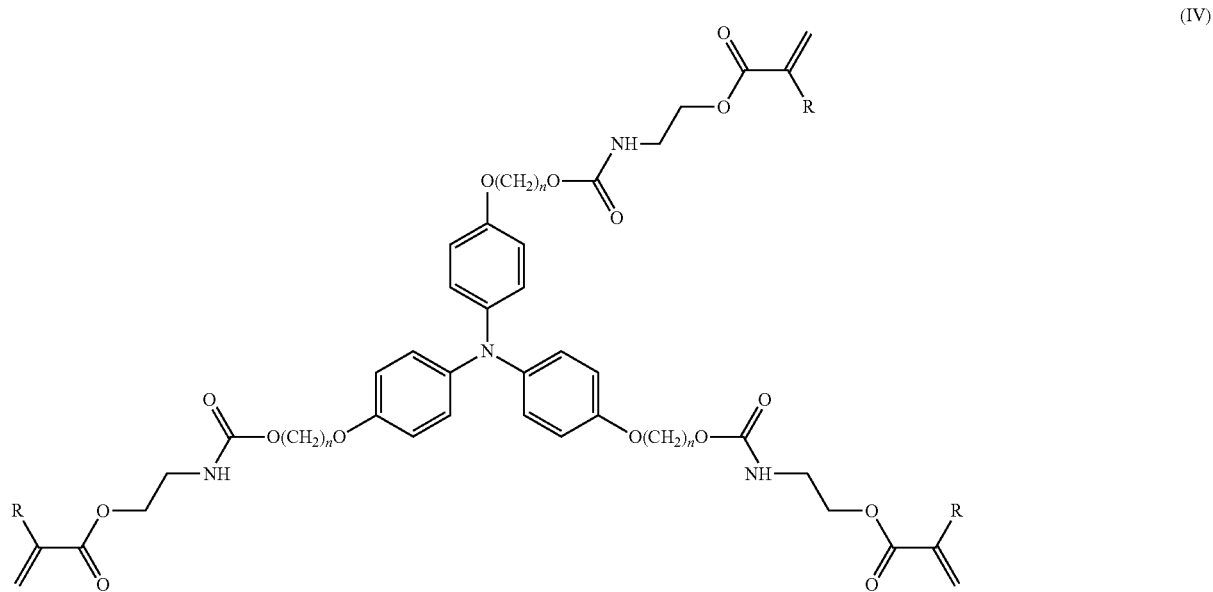
(IV)
wherein x has a value of a whole number; n has a value of a counting number; R' is H or CH₃; and R is H or CH₃.
4. The overcoat layer of claim 1, wherein the urethane acrylate functional charge transport molecule comprises tetra-aryl benzidine of formulae (V)-(XII):
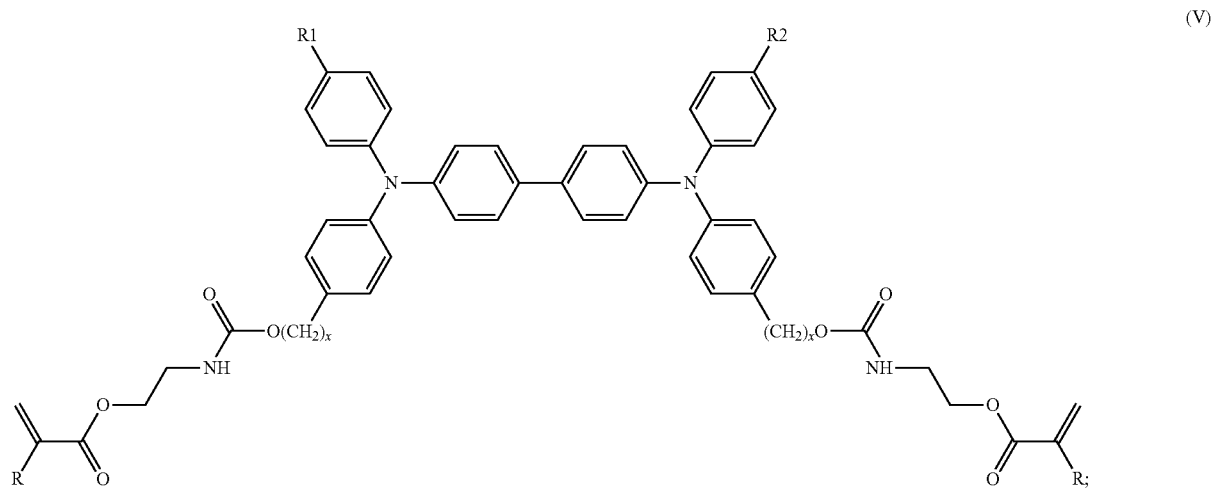
(V)

-continued
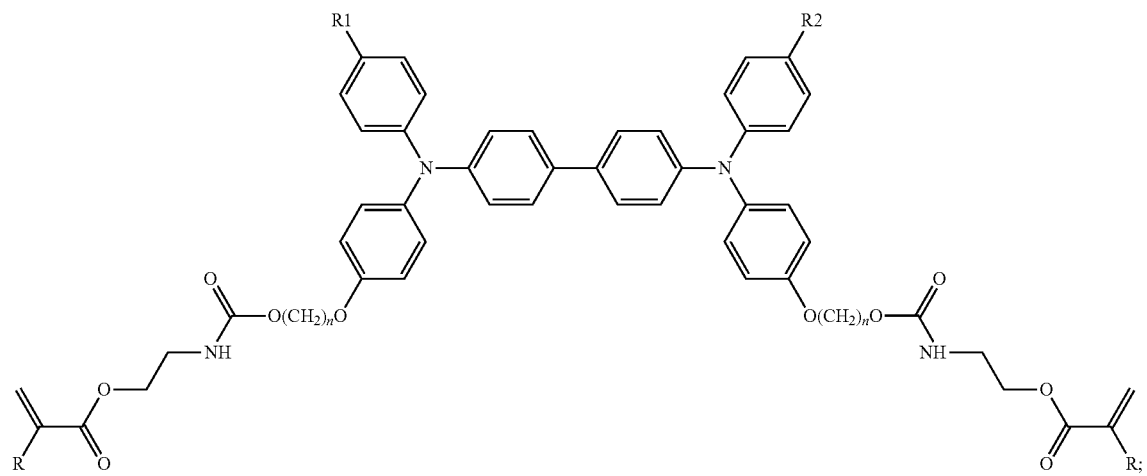
(VI)
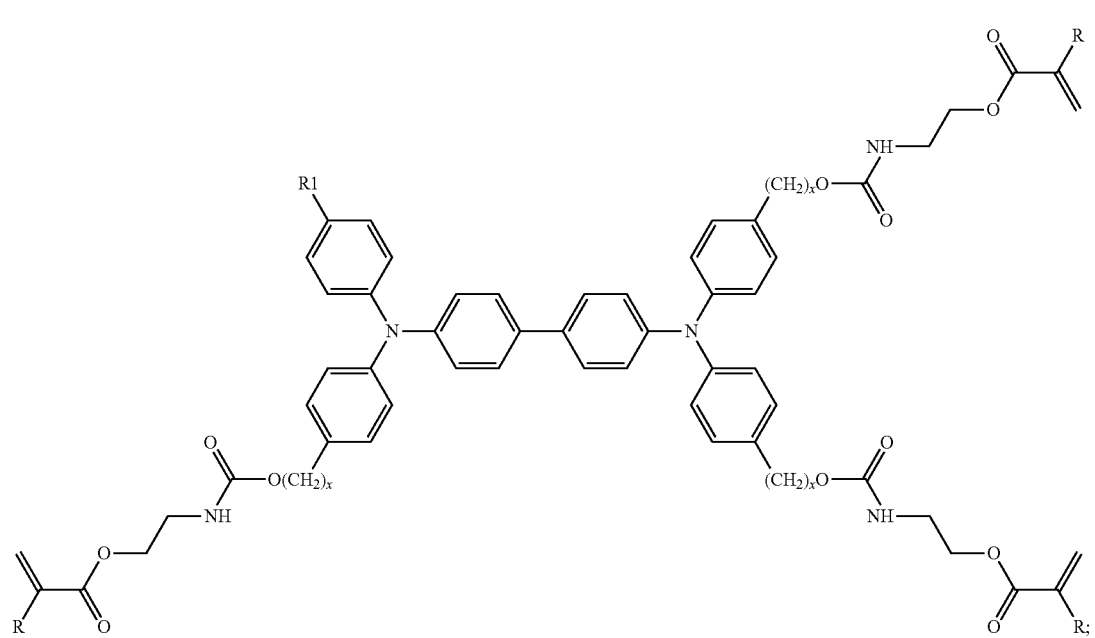
(VII)

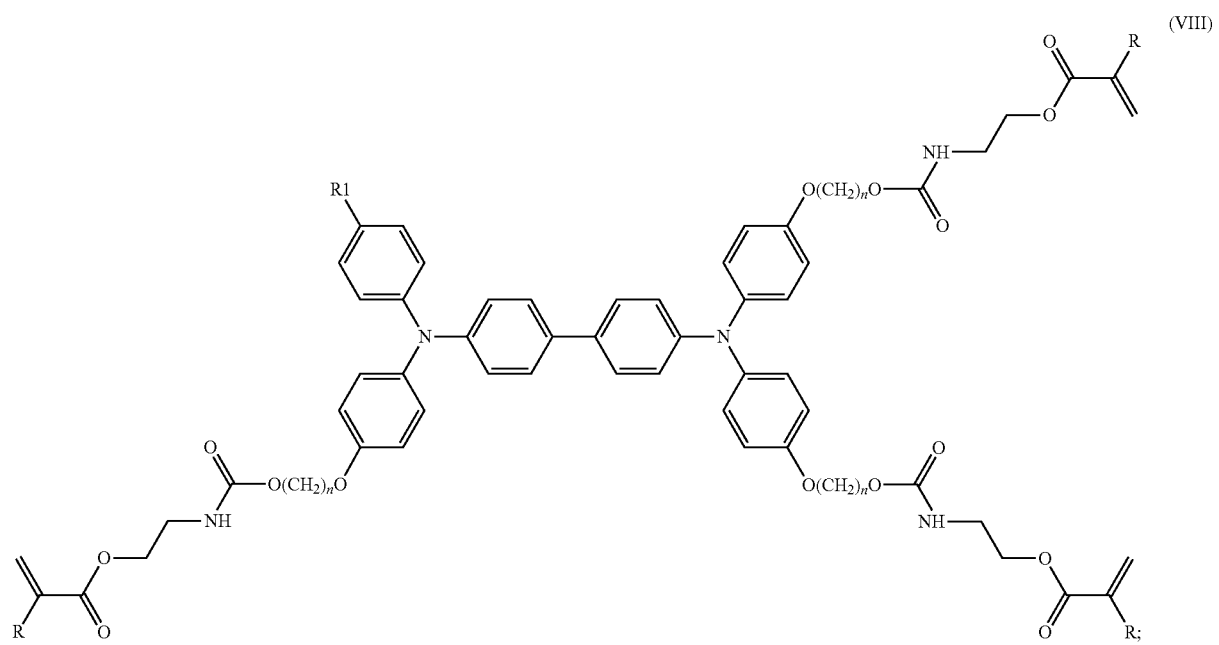
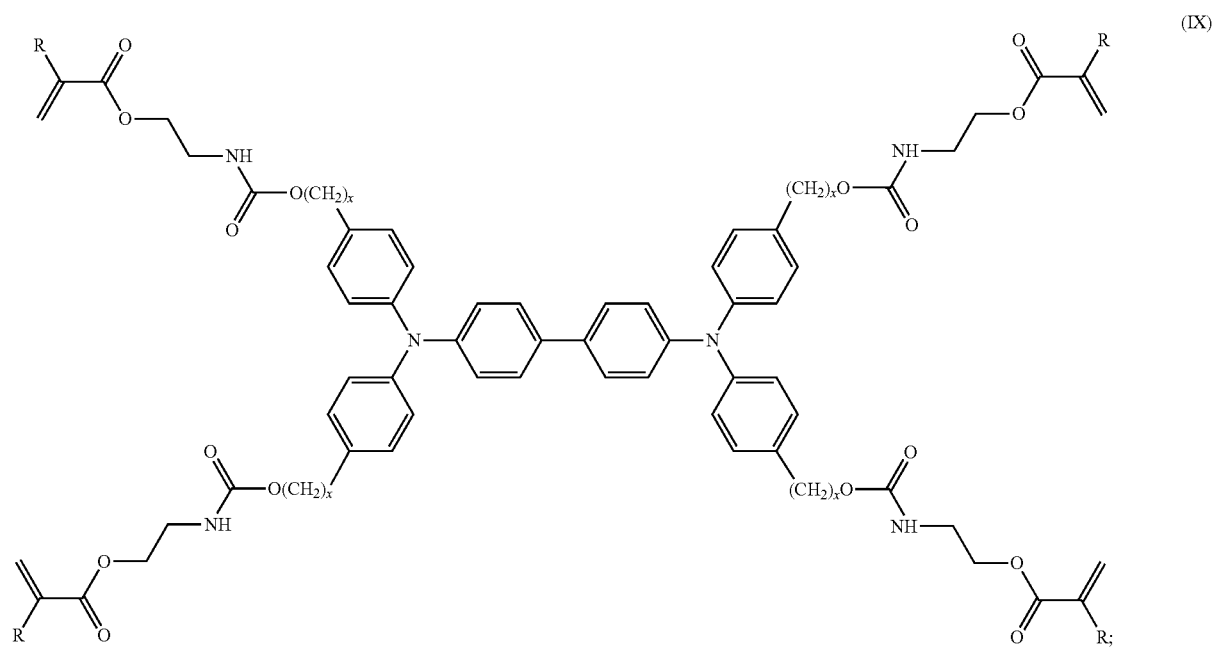

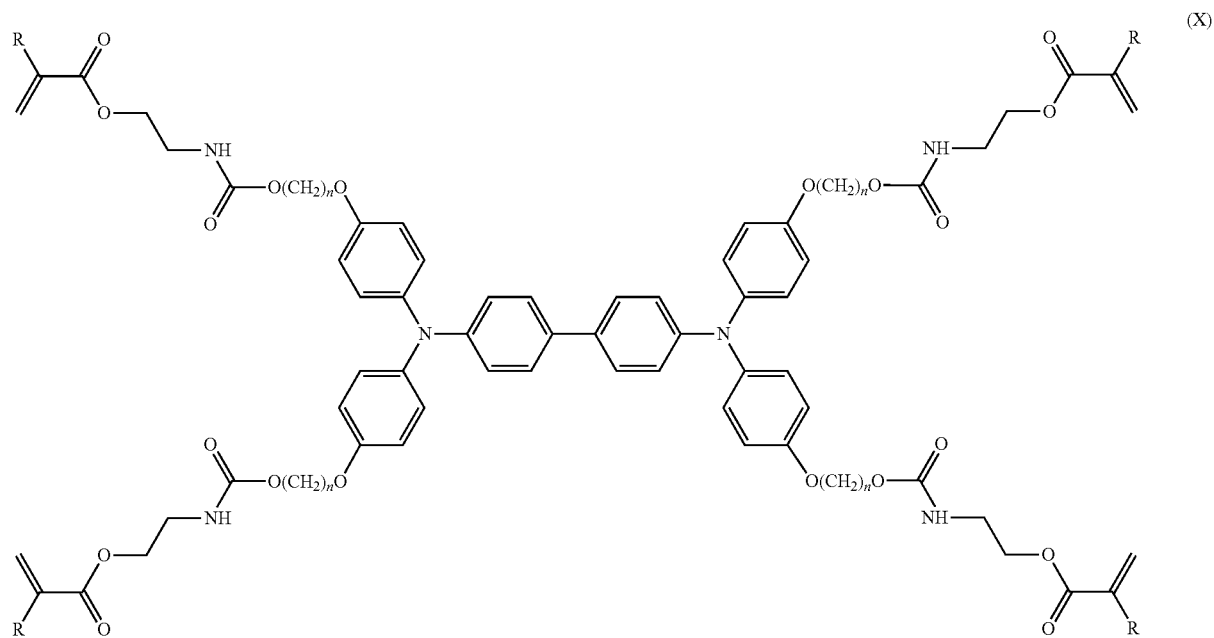
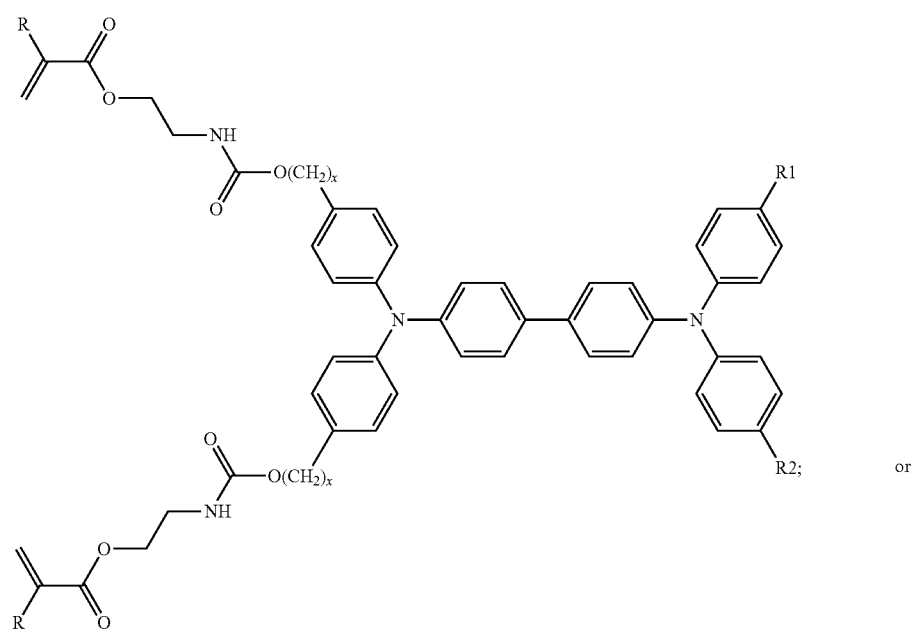

(XII)
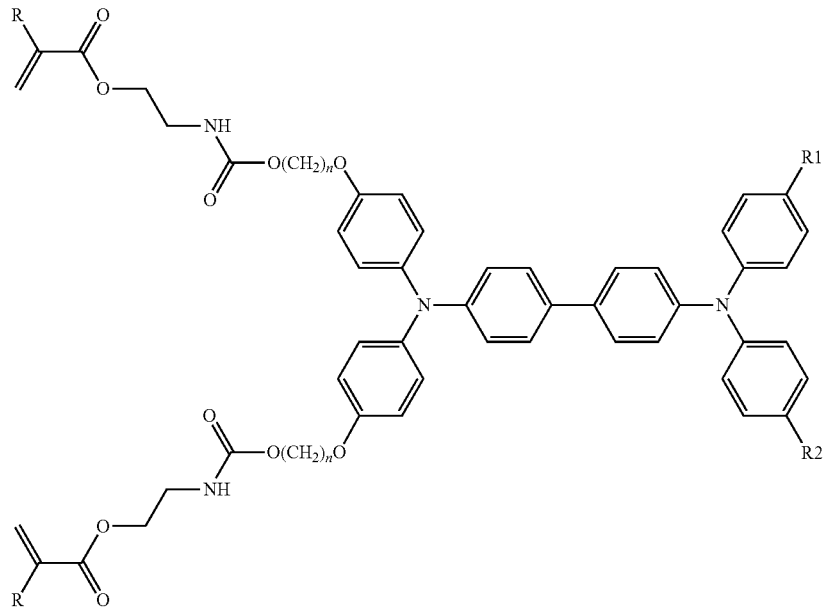
wherein x has a value of a whole number; n has a value of a counting number; R is H or $CH_3$; R1 is H or $CH_3$; and R2 is H or $CH_3$.
5. The overcoat layer of claim 1, wherein the urethane acrylate functional charge transport molecule comprises tetra-aryl phenylene diamine of formulae (XIII)-(XVI):
(XIII)
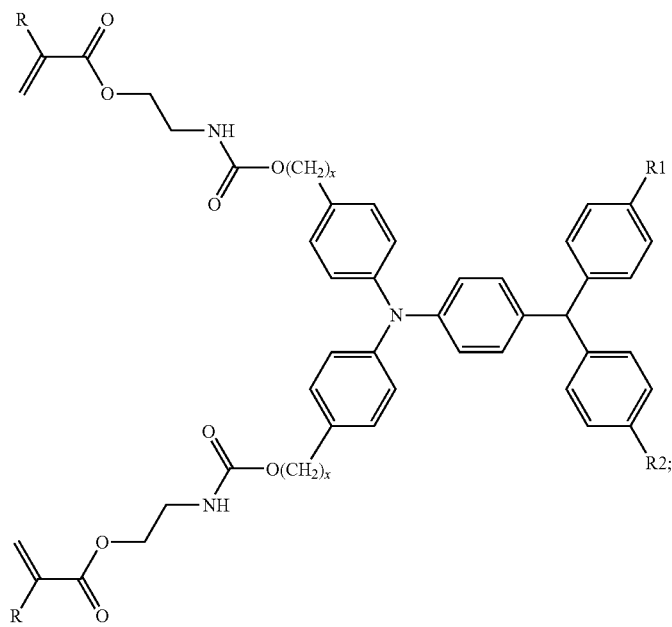

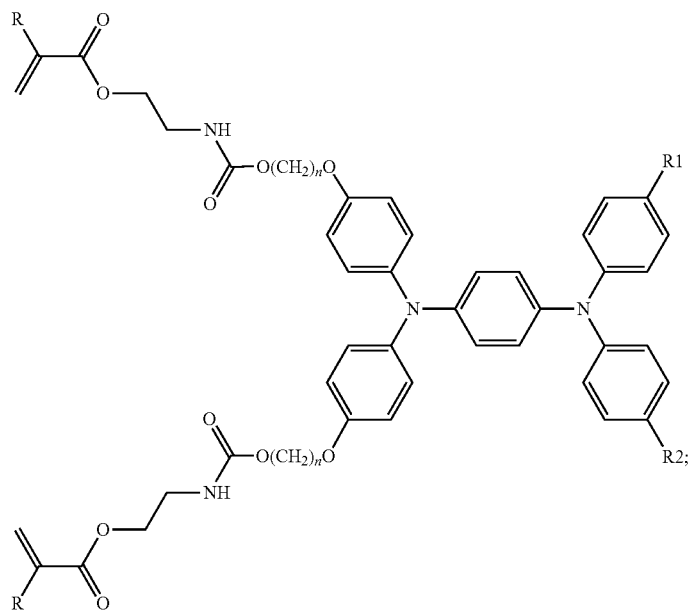
(XIV)
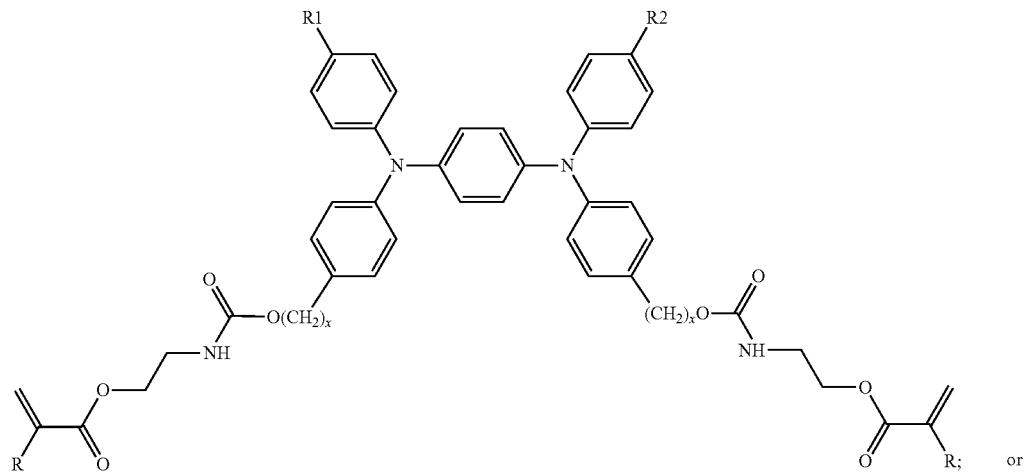
(XV)
or
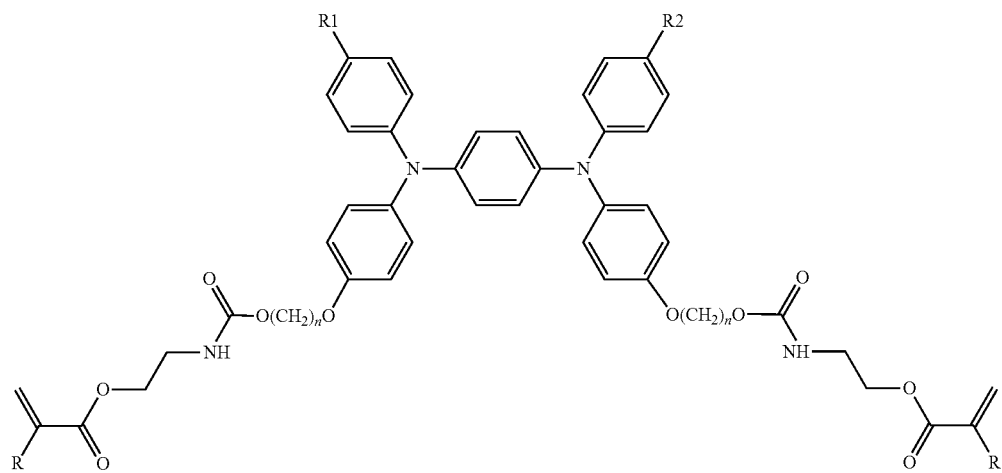
(XVI)
wherein x has a value of a whole number; n has a value of a counting number; R is H or $CH_3$; R1 is H or $CH_3$; and R2 is H or $CH_3$.
6. The overcoat layer of claim 1, wherein the curable composition further comprises crosslinkable additives comprising acrylates, diacrylates or urethane acrylates.

7. The overcoat layer of claim 1, wherein the curable composition further comprises a hexa-functional aromatic urethane acrylate resin.

8. The overcoat layer of claim 1, wherein the curable composition further comprises a hexa-functional aliphatic urethane acrylate resin.

9. The overcoat layer of claim 1, wherein the overcoat layer has a thickness of about 0.1 μm to about 10 μm.

10. An organic photoconductor drum comprising:
a support element;
a charge generation layer disposed over the support element;
a charge transport layer disposed over the charge generation layer; and
a protective overcoat layer formed as an outermost layer of the organic photoconductor drum, the protective overcoat layer being formed from a curable composition including:
a urethane methacrylate functional charge transport molecule or urethane acrylate functional charge transport molecule that is a reaction product of hydroxyl functional charge transport molecule and a monomer having an isocyanate group and an acrylate group; and
a photoinitiator.

11. The overcoat layer of claim 10, wherein the hydroxyl functional charge transport molecule is selected from the group consisting of a di-hydroxy functional charge transport molecule, a tri-hydroxy functional charge transport molecule, and a tetra-hydroxy functional charge transport molecule.

* * * * *